(12) United States Patent
Ponulak et al.

(10) Patent No.: US 8,990,133 B1
(45) Date of Patent: Mar. 24, 2015

(54) APPARATUS AND METHODS FOR STATE-DEPENDENT LEARNING IN SPIKING NEURON NETWORKS

(71) Applicants: Filip Ponulak, San Diego, CA (US); Oleg Sinyavskiy, San Diego, CA (US)

(72) Inventors: Filip Ponulak, San Diego, CA (US); Oleg Sinyavskiy, San Diego, CA (US)

(73) Assignee: Brain Corporation, San Diego, CA (US)

( * ) Notice: Subject to any disclaimer, the term of this patent is extended or adjusted under 35 U.S.C. 154(b) by 318 days.

(21) Appl. No.: 13/722,769

(22) Filed: Dec. 20, 2012

(51) Int. Cl.
*G06N 3/08* (2006.01)
*G06N 3/02* (2006.01)

(52) U.S. Cl.
CPC ... *G06N 3/02* (2013.01); *G06N 3/08* (2013.01)
USPC .......................................................... 706/25

(58) Field of Classification Search
None
See application file for complete search history.

(56) References Cited

U.S. PATENT DOCUMENTS

| | | |
|---|---|---|
| 5,063,603 A | 11/1991 | Burt |
| 5,092,343 A | 3/1992 | Spitzer |
| 5,245,672 A | 9/1993 | Wilson |
| 5,355,435 A | 10/1994 | Deyong |
| 5,388,186 A | 2/1995 | Bose |
| 5,408,588 A | 4/1995 | Ulug |
| 5,467,428 A | 11/1995 | Ulug |
| 5,638,359 A | 6/1997 | Peltola |
| 5,673,367 A | 9/1997 | Buckley |
| 5,875,108 A | 2/1999 | Hoffberg |
| 6,009,418 A | 12/1999 | Cooper |
| 6,014,653 A | 1/2000 | Thaler |
| 6,363,369 B1 | 3/2002 | Liaw |
| 6,458,157 B1 | 10/2002 | Suaning |
| 6,545,705 B1 | 4/2003 | Sigel |
| 6,545,708 B1 | 4/2003 | Tamayama |
| 6,546,291 B2 | 4/2003 | Merfeld |
| 6,581,046 B1 | 6/2003 | Ahissar |

(Continued)

FOREIGN PATENT DOCUMENTS

| | | |
|---|---|---|
| CN | 102226740 A | 10/2011 |
| EP | 1089436 A2 | 4/2001 |

(Continued)

OTHER PUBLICATIONS

Schrauwen et al. "Improving SpikeProp: Enhancements to an Error-Backpropagation Rule for Spiking Neural Networks", ProRISC workshop, 2004, pp. 301-305.*

(Continued)

*Primary Examiner* — Li-Wu Chang
(74) *Attorney, Agent, or Firm* — Pillsbury Winthrop Shaw Pittman LLP

(57) ABSTRACT

State-dependent supervised learning framework in artificial neuron networks may be implemented. A framework may be used to describe plasticity updates of neuron connections based on a connection state term and a neuron state term. Connection states may be updated based on inputs and outputs to and/or from neurons. The input connections of a neuron may be updated using input traces comprising a time-history of inputs provided via the connection. Weight of the connection may be updated and connection state may be time varying. The updated weights may be determined using a rate of change of the input trace and a term comprising a product of a per-neuron contribution and a per-connection contribution configured to account for the state time-dependency. Using event-dependent connection change components, connection updates may be executed on a per neuron basis, as opposed to a per-connection basis.

20 Claims, 14 Drawing Sheets

(56) References Cited

U.S. PATENT DOCUMENTS

| | | |
|---|---|---|
| 6,601,049 B1 | 7/2003 | Cooper |
| 6,643,627 B2 | 11/2003 | Liaw |
| 7,395,251 B2 | 7/2008 | Linsker |
| 7,426,501 B2 | 9/2008 | Nugent |
| 7,672,920 B2 | 3/2010 | Ito |
| 7,849,030 B2 | 12/2010 | Ellingsworth |
| 8,015,130 B2 | 9/2011 | Matsugu |
| 8,103,602 B2 | 1/2012 | Izhikevich |
| 8,315,305 B2 | 11/2012 | Petre |
| 8,467,623 B2 | 6/2013 | Izhikevich |
| 8,655,815 B2 | 2/2014 | Palmer |
| 2002/0038294 A1 | 3/2002 | Matsugu |
| 2003/0050903 A1 | 3/2003 | Liaw |
| 2004/0193670 A1 | 9/2004 | Langan |
| 2005/0015351 A1 | 1/2005 | Nugent |
| 2005/0036649 A1 | 2/2005 | Yokono |
| 2005/0283450 A1 | 12/2005 | Matsugu |
| 2006/0161218 A1 | 7/2006 | Danilov |
| 2007/0022068 A1 | 1/2007 | Linsker |
| 2007/0176643 A1 | 8/2007 | Nugent |
| 2007/0208678 A1 | 9/2007 | Matsugu |
| 2008/0024345 A1 | 1/2008 | Watson |
| 2008/0162391 A1 | 7/2008 | Izhikevich |
| 2009/0043722 A1 | 2/2009 | Nugent |
| 2009/0287624 A1 | 11/2009 | Rouat |
| 2010/0086171 A1 | 4/2010 | Lapstun |
| 2010/0166320 A1 | 7/2010 | Paquier |
| 2010/0198765 A1 | 8/2010 | Fiorillo |
| 2011/0016071 A1 | 1/2011 | Guillen |
| 2011/0119214 A1 | 5/2011 | Breitwisch |
| 2011/0119215 A1 | 5/2011 | Elmegreen |
| 2011/0160741 A1 | 6/2011 | Asano |
| 2012/0011090 A1 | 1/2012 | Tang |
| 2012/0011093 A1 | 1/2012 | Aparin |
| 2012/0036099 A1 | 2/2012 | Venkatraman |
| 2012/0109866 A1 | 5/2012 | Modha |
| 2012/0303091 A1 | 11/2012 | Izhikevich |
| 2012/0308076 A1 | 12/2012 | Piekniewski |
| 2012/0308136 A1 | 12/2012 | Izhikevich |
| 2013/0073080 A1 | 3/2013 | Ponulak |
| 2013/0073491 A1 | 3/2013 | Izhikevich |
| 2013/0073493 A1 | 3/2013 | Modha |
| 2013/0073496 A1 | 3/2013 | Szatmary |
| 2013/0073500 A1 | 3/2013 | Szatmary |
| 2013/0151448 A1 | 6/2013 | Ponulak |
| 2013/0151449 A1 | 6/2013 | Ponulak |
| 2013/0151450 A1 | 6/2013 | Ponulak |
| 2013/0218821 A1 | 8/2013 | Szatmary |
| 2013/0251278 A1 | 9/2013 | Izhikevich |
| 2013/0297541 A1 | 11/2013 | Piekniewski |
| 2013/0325766 A1* | 12/2013 | Petre et al. ............ 706/15 |
| 2013/0325768 A1 | 12/2013 | Sinyavskiy |
| 2013/0325773 A1 | 12/2013 | Sinyavskiy |
| 2013/0325774 A1 | 12/2013 | Sinyavskiy |
| 2013/0325775 A1 | 12/2013 | Sinyavskiy |
| 2013/0325776 A1 | 12/2013 | Ponulak |
| 2013/0325777 A1* | 12/2013 | Petre et al. ............ 706/26 |
| 2014/0016858 A1 | 1/2014 | Richert |
| 2014/0025613 A1 | 1/2014 | Ponulak |
| 2014/0032458 A1 | 1/2014 | Sinyavskiy |
| 2014/0193066 A1 | 7/2014 | Richert |

FOREIGN PATENT DOCUMENTS

| | | |
|---|---|---|
| JP | 4087423 | 3/1992 |
| RU | 2108612 C1 | 10/1998 |
| RU | 2406105 C2 | 12/2010 |
| WO | 2008083335 A2 | 7/2008 |
| WO | 2008132066 A1 | 11/2008 |

OTHER PUBLICATIONS

PCT International Search Report for International Application PCT/US2013/060352 dated Jan. 16, 2014.

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepagcs, cwi ,n11-sbolltedmblica6ond)hdthesislxif>.

Brette et al., Brian: a simple and flexible simulator for spiking neural networks, The Neuromorphic Engineer, Jul. 1, 2009, pp. 1-4, doi: 10.2417/1200906.1659.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.

Floreano et al., 'Neuroevolution: from architectures to learning' Evol. Intel. Jan. 2008 1:47-62, [retrieved Dec. 30, 2013] [retrieved online from URL:<http://inforscience.epfl.ch/record/112676/files/FloreanoDuerrMattiussi2008.p df>.

Gewaltig et al., 'NEST (Neural Simulation Tool)', Scholarpedia, 2007, pp. 1-15, 2(4): 1430, doi: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Goodman et al., Brian: a simulator for spiking neural networks in Python, Frontiers in Neuroinformatics, Nov. 2008, pp. 1-10, vol. 2, Article 5.

Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.

Izhikevich, 'Polychronization: Computation with Spikes', Neural Computation, 25, 2006, 18, 245-282.

Izhikevich, 'Simple Model of Spiking Neurons'IEEE Transactions on Neural Networks, vol. 14, No. 6, Nov. 2003, pp. 1569-1572.

Izhikevich et al., 'Relating STDP to BCM', Neural Computation (2003) 15, 1511-1523.

Karbowski et al., 'Multispikes and Synchronization in a Large Neural Network with Temporal Delays', Neural Computation 12, 1573-1606 (2000).

Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.

Laurent, 'The Neural Network Query Language (NNQL) Reference' [retrieved on Nov. 12, 2013]. Retrieved from the Internet: <URL'https://code.google.com/p/nnql/issues/detail?id=1>.

Laurent, 'Issue 1—nnql—Refactor Nucleus into its own file—Neural Network Query Language' [retrieved on Nov. 12, 2013]. Retrieved from the Internet: URL:https://code.google.com/p/nnql/issues/detail?id=1.

Nichols, A Re configurable Computing Architecture for Implementing Artificial Neural Networks on FPGA, Master's Thesis, The University of Guelph, 2003, pp. 1-235.

Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].

(56) References Cited

OTHER PUBLICATIONS

Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.egi/4620/ps/1774.pdf>.
Simulink.RTM. model [online], [Retrieved on Dec. 10, 2013] Retrieved from <URL: http://www.mathworks.com/ products/ simulink/index.html>.
Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).
Sjostrom et al., 'Spike-Timing Dependent Plasticity' Scholarpedia, 5(2):1362 (2010), pp. 1-18.
Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371 %2Fjournal.pcbi.10008 79#>.
PCT International Search Report for PCT/US2013/052136 dated Nov. 30, 2013.
Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.
Seung, H. "Learning in spiking neural networks by reinforcement of stochastic synaptic transmission." Neuron vol. 40 No. 6 (2003): pp. 1063-1073.
Weber, C. et al. 'Robot docking with neural vision and reinforcement.' Knowledge-Based Systems vol. 17 No. 2 (2004): pp. 165-172.
Baras, D. et al. "Reinforcement learning, spike-time-dependent plasticity, and the BCM rule." Neural Computation vol. 19 No. 8 (2007): pp. 2245-2279.
de Queiroz, M. et al. "Reinforcement learning of a simple control task using the spike response model." Neurocomputing vol. 70 No. 1 (2006): pp. 14-20.
PCT International Search Report and Written Opinion for International Application No. PCT/US2013/044124 dated Sep. 12, 2013.
Bennett (1999), The early history of the synapse: from Plato to Sherrington. Brain Res. Bull., 50(2): 95-118.
Haykin, (1999), Neural Networks: A Comprehensive Foundation (Second Edition), Prentice-Hall.
Kenji, (2000), Reinforcement Learning in Continuous Time and Space, Neural Computation, 12:1, 219-245.
Klute et al., (2002). Artificial Muscles: Actuators for Biorobotic Systems. The International Journal 0./ Robotics Research 21 :295-309.
Lendek et al., (2006) State Estimation under Uncertainty: A Survey. Technical report 06-004, Delft Center for Systems and Control Delft University of Technology.
Legenstein et al., (2008), A learning theory for reward-modulated spike timing-dependent plasticity with application to biofeedback. PLoS Computational Biology, 4(10): 1-27.
Ponulak et al., (2010) Supervised Learning in Spiking Neural Networks with ReSuMe: Sequence Learning, Classification and Spike-Shifting. Neural Comp., 22(2): 467-510.
Sutton et al., (1998), Reinforcement Learning, an Introduction. MIT Press.
Schreiber et al., (2003), A new correlation-based measure of spike timing reliability. Neurocomputing, 52-54, 925-931.
Sutton, (1988). Learning to predict by the methods of temporal differences. Machine Learning 3(1), 9-44.
Stein, (1967). Some models of neural variability. Biophys. J., 7: 37-68.
Werbos, (1992), or Prokhorov D.V and Wunsch D.C. (1997) Adaptive Critic Designs, IEEE Trans Neural Networks, vol. 8, No. 5, pp. 997-1007.
White et al., (Eds.) (1992) Handbook of Intelligent Control: Neural, Fuzzy and Adaptive Approaches. Van Nostrand Reinhold, New York.
Widrow et al., (1960) Adaptive Switching Circuits. IRE WESCON Convention Record 4: 96-104.

Florian (2007) Reinforcement Learning Through Modulation of Spike-Timing-Dependent Synaptic Plasticity, Neural Computation 19, 1468-1502 Massachusetts Institute of Technology.
Morrison, (2008)Phenomenological models of synaptic plasticity based on spike timing, Received: Jan. 16, 2008 / Accepted: Apr. 9, 2008 The Author(s).
Bouganis et al., (2010) "Training a Spiking Neural Network to Control a 4-DoF Robotic Arm based on Spike Timing-Dependent Plasticity", Proceedings of WCCI201 0 IEEE World Congress on Computational Intelligence, CCIB, Barcelona, Spain, Jul. 18-23, 2010, pp. 4104-4111.
Xie et al., (2004) "Learning in neural networks by reinforcement of irregular spiking", Physical Review E, vol. 69, letter 041909, pp. 1-10.
Floreano et al., (2008) Floreano et al. Neuroevolution: From Architectures to learning Evol. Intel. Jan. 2008 1:47-62 (retrieved online on Apr. 24, 2013 from http://infoscience.epfl.ch/record/112676/files/ FloreanoDuerrMattiussi2008pdf).
Aleksandrov (1968), Stochastic optimization, Engineering Cybernetics, 5, 11-16.
Amari (1998), Why natural gradient?, Acoustics, Speech and Signal Processing, (pp. 1213-1216). Seattle, WA, USA.
Bartlett et al., (2000) "A Biologically Plausible and Locally Optimal Learning Algorithm for Spiking Neurons" Retrieved from http://arp.anu.edu.au/ftp/papers/jon/brains.pdf.gz.
Bohte et al., "A Computational Theory of Spike-Timing Dependent Plasticity: Achieving Robust Neural Responses via Conditional Entropy Minimization" 2004.
Bohte, (2000). SpikeProp: backpropagation for networks of spiking neurons. In Proceedings of ESANN'2000, (pp. 419-424).
Booij (2005, 6). A Gradient Descent Rule for Spiking Neurons Emitting Multiple Spikes. Information Processing Letters n. 6, v.95 , 552--558.
Breiman et al., "Random Forests" 33pgs, Jan. 2001.
Capel, "Random Forests and Ferns" LPAC, Jan. 11, 2012, 40 pgs.
Fletcher (1987), Practical methods of optimization, New York, NY: Wiley-Interscience.
Fremaux et al., "Functional Requirements for Reward-Modulated Spike-Timing-Dependent Plasticity", The Journal of Neuroscience, Oct. 6, 2010, 30(40):13326-13337.
Fu (2005) Stochastic Gradient Estimation, Technical Research Report.
Fu (2008), What You Should Know About Simulation and Derivatives Naval Research Logistics, vol. 55, No. 8 , 723-736.
Fyfe et al., (2007), Reinforcement Learning Reward Functions for Unsupervised Learning, ISNN '07 Proceedings of the 4th international symposium on Neural Networks: Advances in Neural Networks.
Gerstner (2002), Spiking neuron models: single neurons, populations, plasticity, Cambridge, U.K.: Cambridge University Press.
Glynn (1995), Likelihood ratio gradient estimation for regenerative stochastic recursions, Advances in Applied Probability, 27, 4, 1019-1053.
Ho, "Random Decision Forests" Int'l Conf. Document Analysis and Recognition, 1995, 5 pgs.
Izhikevich (2007), Solving the distal reward problem through linkage of STDP and dopamine signaling, Cerebral Cortex, vol. 17, pp. 2443-2452.
Kalal et al. "Online learning of robust object detectors during unstable tracking" published on 3rd On-line Learning for Computer Vision Workshop 2009, Kyoto, Japan, IEEE CS.
Kiefer (1952), Stochastic Estimation of the Maximum of a Regression Function, Annals of Mathematical Statistics 23, #3, 462-466.
Klampfl (2009), Spiking neurons can learn to solve information bottleneck problems and extract independent components, Neural Computation, 21(4), pp. 911-959.
Kleijnen et al., Optimization and sensitivity analysis of computer simulation models by the score function method Invited Review European Journal of Operational Research, Mar. 1995.
Larochelle et al., (2009), Exploring Strategies for Training Deep Neural Networks, J. of Machine Learning Research, v. 10, pp. 1-40.

(56) References Cited

OTHER PUBLICATIONS

Ojala et al., "Performance Evaluation of Texture Measures with Classification Based on Kullback Discrimination of Distributions" 1994 IEEE, pp. 582-585.

Ozuysal et al., "Fast Keypoint Recognition Using Random Ferns" IEEE Transactions on Pattern Analysis and Machine Intelligence, vol. 32, No. 3, Mar. 2010, pp. 448-461.

Pfister (2003), Optimal Hebbian Learning: A Probabilistic Point of View, In ICANN Proceedings. Springer, pp. 92-98.

Reiman et al. (1989). Sensitivity analysis for simulations via likelihood ratios. Oper Res 37, 830-844.

Robbins (1951), A Stochastic Approximation Method, Annals of Mathematical Statistics 22, #3, 400-407.

Rosenstein et al., (2002), Supervised learning combined with an actor-critic architecture, Technical Report 02-41, Department of Computer Science, University of Massachusetts, Amherst.

Rumelhart et al., (1986), Learning representations by back-propagating errors, Nature 323 (6088), pp. 533-536.

Rumelhart (1986), Learning internal representations by error propagation, Parallel distributed processing, vol. 1 (pp. 318-362), Cambridge, MA: MIT Press.

Sinyavskiy, et al. "Generalized Stochatic Spiking Neuron Model and Extended Spike Response Model in Spatial-Temporal Impulse Pattern Detection Task", Optical Memory and Neural Networks (Information Optics), 2010, vol. 19, No. 4, pp. 300-309, 2010.

Tishby et al., (1999), The information bottleneck method, In Proceedings of the 37th Annual Allerton Conference on Communication, Control and Computing, B Hajek & RS Sreenivas, eds., pp. 368-377, University of Illinois.

Toyoizumi et al., (2005), Generalized Bienenstock-Cooper-Munro rule for spiking neurons that maximizes information transmission, Proc. Natl. Acad. Sci. USA, 102, (pp. 5239-5244).

Vasilaki et al., "Spike-Based Reinforcement Learning in Continuous State and Action Space: When Policy Gradient Methods Fail" PLoS, vol. 5, Issue 12, Dec. 2009.

Vasilaki, et al., "Learning flexible sensori-motor mappings in a complex network" Biol Cybern (2009) 100:147-158.

Weaver (2001), The Optimal Reward Baseline for Gradient-Based Reinforcement Learning, UAI 01 Proceedings of the 17th Conference in Uncertainty in Artificial Intelligence (pp. 538-545). Morgan Kaufman Publishers.

Weber et al., (2009), Goal-Directed Feature Learning, In: Proc, International Joint Conference on Neural Networks, 3319-3326.

Williams (1992), Simple Statistical Gradient-Following Algorithms for Connectionist Reinforcement Learning, Machine Learning 8, 229-256.

Sherrington , (1897); The Central Nervous System. A Textbook of Physiology, 7th ed., part III, Ed. by Foster M. Macmillian and Co. Ltd., London, p. 929.

Ponulak, "Analysis of the Resume learning Process for Spiking Neural Networks," International Journal of Applied Mathematics & Computer Science: Jun. 2008, vol. 18, Issue 2, p. 117.

\* cited by examiner

APPARATUS AND METHODS FOR STATE-DEPENDENT LEARNING IN SPIKING NEURON NETWORKS

CROSS-REFERENCE TO RELATED APPLICATIONS

This application is related to a co-owned and co-pending U.S. patent application Ser. No. 13/487,533, entitled "STOCHASTIC SPIKING NETWORK LEARNING APPARATUS AND METHODS" filed Jun. 4, 2012, U.S. patent application Ser. No. 13/489,280 entitled "APPARATUS AND METHODS FOR REINFORCEMENT LEARNING IN ARTIFICIAL NEURAL NETWORKS", filed Jun. 5, 2012, "U.S. patent application Ser. No. 13/487,499 entitled "STOCHASTIC APPARATUS AND METHODS FOR IMPLEMENTING GENERALIZED LEARNING RULES", filed Jun. 4, 2012, U.S. patent application Ser. No. 13/560,891 entitled "APPARATUS AND METHODS FOR EFFICIENT UPDATES IN SPIKING NEURON NETWORKS", U.S. patent application Ser. No. 13/560,902, entitled "APPARATUS AND METHODS FOR STATE-DEPENDENT LEARNING IN SPIKING NEURON NETWORKS", filed Jul. 27, 2012, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present disclosure relates to implementing state-dependent learning in spiking neuron networks.

2. Description of Related Art

Spiking neuron networks are known. Many existing neural networks involve target-oriented learning. Target-oriented learning, however, may not always provide sufficiently rapid convergence and may lack accuracy.

SUMMARY

One aspect of the disclosure relates to a computerized spiking neuron apparatus configured to implement a supervised learning process. The apparatus may comprise one or more processors configured to execute computer program modules. The computer program modules may be executable to cause one or more processors to: based on an event, determine excitability of the neuron, the excitability being updateable in accordance with one or more inputs to the neuron, the inputs being configured to provide data related to an environment external to the neuron; and based on the excitability, determine an efficacy adjustment for at least one connection of the neuron, a given neuron being configured to provide at least a portion of the one or more inputs to the neuron.

In some implementations, the event may be based on a pre-synaptic input comprising at least a portion of the one or more inputs. The computer program modules may be further executable to cause one or more processors to update the excitability based on the pre-synaptic input.

In some implementations, the event may comprise a teaching signal indicative of a target output for the neuron. The excitability may be configured to characterize a current state of the neuron associated with the learning process. The adjustment may be configured to transition the current state towards a target state. The target state may be associated with the target output.

In some implementations, the at least one connection may be potentiated when the event is associated with a teaching signal indicative of a target output for the neuron. The adjustment may be configured to transition the current state towards a target state. The target state may be associated with the target output.

In some implementations, the connection may be depressed when the event is associated with a post-synaptic response by the neuron.

Another aspect of the disclosure relates to a computer-implemented method of operating a data interface of a node in a computerized network. The method may be performed by one or more processors configured to execute computer program modules. The method may comprise updating an efficacy of the interface based on a parameter characterizing a current state of the node. The node may be configured to generate an output based on one or more inputs via the interface. The one or more inputs may be configured to modify the parameter. The update may be configured to transition the current state towards a target state. The target state may be associated with the node producing target output.

In some implementations, the update may be configured to transition the present state towards a target state. The target state may be associated with the node to generate an output consistent with one or more data items.

In some implementations, the node may comprise a spiking neuron. The input may comprise one or more spikes. The interface may comprise a synaptic connection capable of communicating the one or more spikes to the neuron. The efficacy may comprise a transmission probability of data through the input connection. The parameter may be configured to characterize a membrane potential of the neuron. The update may comprise a change of the transmission probability being determined based on a function of the membrane potential.

In some implementations, the change of the weight may be determined based on a value of an eligibility trace. The eligibility trace may comprise a time history of the one or more spikes. The time history may include information associated with individual ones of the one or more spikes occurring at time instances prior to the update.

In some implementations, the modification of the parameter may be effectuated in accordance with a response process. The response process may be configured based on the current state breaching a response threshold. The efficacy update may comprise an efficacy change. The efficacy change may be configured proportional to a difference between the current state and the response threshold.

In some implementations, the modification of the parameter may be effectuated in accordance with a response process. The response process may be configured based on the current state breaching a response threshold. The efficacy update may comprise an efficacy change. The efficacy change may be determined based on a base change value less an adjustment value. The adjustment value may be configured based on a difference between the current state and the response threshold.

In some implementations, the adjustment value may be configured proportional to the difference between the current state and the response threshold.

In some implementations, the adjustment value may be configured based on an exponential function of the difference between the current state and the threshold so that one value of the difference causes a smaller adjustment value compared to another value of the difference that is greater than the one value.

In some implementations, the node may comprise a spiking neuron. The input may comprise one or more spikes. The interface may comprise a synaptic connection configured to communicate the one or more spikes to the neuron. The efficacy may comprise a connection weight. The parameter may be configured to characterize membrane potential of the neuron. The update may comprises a change of the weight. The change of the weight may be determined based on a function of (i) the membrane potential and (ii) a value of an eligibility trace. The eligibility trace may comprise a time history of the one or more spikes. The time history may include information associated with individual ones of the one or more spikes occurring at time instances prior to the update.

In some implementations, the node may comprise a spiking neuron operable in accordance with a stochastic neuron response generation process. The input may comprise one or more spikes. The interface may comprise a synaptic connection capable of communicating the one or more spikes to the neuron. The efficacy may comprise a connection weight. The parameter may be configured to characterize probability of the response being generated in accordance with the response generation process. The efficacy update may comprise a change of the weight. The change of the weight may be determined based on a function of the probability of the response at the time of the update.

In some implementations, for a first value of the probability of the response, the function may be configured to produce a smaller change in the weight compared to the weight change associated with a second value of the probability of the response. The first value may be greater than the second value.

Yet another aspect of the disclosure relates to a computerized spiking neuron network system configured to determine efficacy of a connection for a response by a neuron configured to receive input via the connection. The system may comprise one or more processors configured to execute computer program modules. The computer program modules may be executable to cause one or more processors to: determine a state parameter of the neuron based on a history of neuron excitability, the state parameter being configured to characterize the excitability, the history of the neuron excitability being based on the neuron excitability prior to the response by the neuron; and determine an adjustment of the efficacy based on the state parameter, the efficacy being configured to characterize an effect of the input on the efficacy.

In some implementations, the neuron may be operable in accordance with a learning process. The learning process may be configured to achieve a target outcome. The neuron excitability may be configured to characterize a state of the process based on the input. The history of the excitability may be determined based on a low pass filter of the excitability.

In some implementations, the state parameter may be determined based on a time integral of the excitability over a time window prior to the response time.

In some implementations, the state parameter may be determined based on a moving average of the excitability over a time window prior to the response time.

In some implementations, responsive to the input being updated at a rate of about one millisecond, the time window may be defined as being between one millisecond and five milliseconds, inclusive.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1:
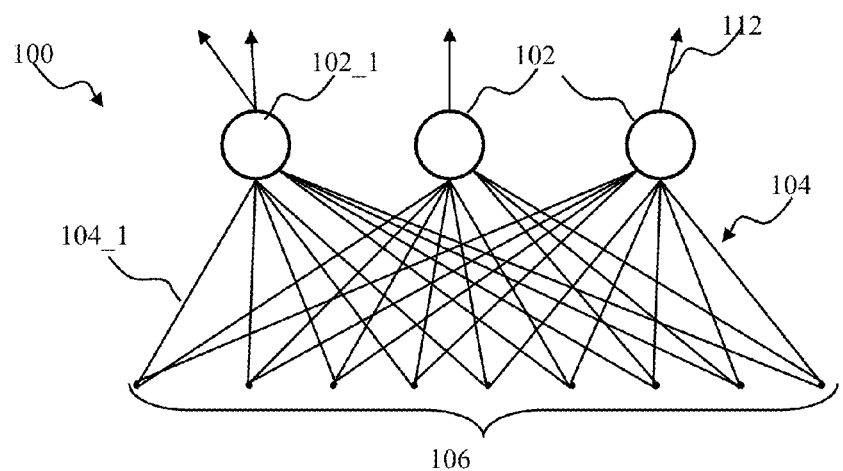
FIG. 1 is a block diagram depicting artificial spiking neural network, according to some implementations.

All Figures disclosed herein are © Copyright 2012 Brain Corporation. All rights reserved.

DETAILED DESCRIPTION

Exemplary implementations of the present disclosure will now be described in detail with reference to the drawings, which are provided as illustrative examples so as to enable those skilled in the art to practice the disclosure. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or similar parts.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" may be meant generally to denote all types of interconnection or communication architecture that may be used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" may be meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" may be meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" may be meant to refer, without limitation, to a network unit (e.g., a spiking neuron and a set of synapses configured to provide input signals to the neuron) having parameters that are subject to adaptation in accordance with a model.

As used herein, the terms "state" and "node state" may be meant generally to denote a full (or partial) set of dynamic variables used to describe node state.

As used herein, the term "synaptic channel", "connection", "link", "transmission channel", "delay line", and "communications channel" include a link between any two or more entities (whether physical (wired or wireless), or logical/ virtual) which enables information exchange between the entities, and may be characterized by a one or more variables affecting the information exchange.

As used herein, the term "Wi-Fi" may include one or more of IEEE-Std. 802.11, variants of IEEE-Std. 802.11, standards related to IEEE-Std. 802.11 (e.g., 802.11a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

The present disclosure provides, among other things, a computerized apparatus and methods for facilitating state-dependent learning in spiking neuron networks by, inter alia, implementing plasticity updates that are based on internal state of post-synaptic neuron. In one or more implementations, network updates may comprise modification of one or more learning parameters of the network. In some implementations, the learning parameter may comprise synaptic efficacy. The parameter update may comprise plasticity rules that are based on neuron state. In some implementations, the update rule may be effectuated using eligibility traces. In some implementations, the trace may comprise a temporary record of the occurrence of one or more events, such as visiting of a state, and/or the taking of an action (e.g., post-synaptic response), and/or a receipt of pre-synaptic input. The trace may denote characteristics of the event (e.g., the synaptic connection, pre- and post-synaptic neuron IDs) as eligible for undergoing learning changes.

In some implementations, learning parameters of one or more connections may be updated based on an input event, such as pre-synaptic input and/or a teaching signal. In some implementations, the update may be effectuated based on a response by the post-synaptic neuron.

In one or more implementations, the state of the neuron may be characterized by neuron excitability parameter, such as, for example, neuron membrane potential. In order to determine a change of the learning parameter, a current value of the neuron state may be compared to a threshold. In some implementations, the threshold may characterize a pulse generation (e.g., firing threshold) configured such that to cause response by the neuron when the neuron state is above the threshold (e.g., super threshold state).

Detailed descriptions of the various implementation of apparatus and methods of the disclosure are now provided. Although certain aspects of the disclosure can best be understood in the context of robotic adaptive control system comprising a spiking neural network, the disclosure is not so limited. Implementations of the disclosure may also be used for implementing a variety of learning systems, such as, for example, sensory signal processing (e.g., computer vision), signal prediction (e.g., supervised learning), finance applications, data clustering (e.g., unsupervised learning), inventory control, data mining, and/or other applications that do not require performance function derivative computations.

Implementations of the disclosure may be, for example, deployed in a hardware and/or software implementation of a neuromorphic computer system. In some implementations, a robotic system may include a processor embodied in an application specific integrated circuit, which can be adapted or configured for use in an embedded application (e.g., a prosthetic device).

Artificial spiking neural networks may be used to gain an understanding of biological neural networks and/or for solving artificial intelligence problems. These networks may employ a pulse-coded mechanism, which encodes information using timing of the pulses. Such pulses (also referred to as "spikes" or "impulses") are short-lasting (e.g., on the order of 1-2 ms) discrete temporal events. Several exemplary implementations of such encoding are described in a commonly owned and co-pending U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", each incorporated herein by reference in its entirety.

An artificial spiking neural network, such as the network 100 shown for example in FIG. 1, may comprise a plurality of units (or nodes) 102, which correspond to neurons in a biological neural network. A given unit 102 may receive input via connections 104, also referred to as communications channels, or synaptic connections. Any given unit 102 may be connected to other units via connections 112, also referred to as communications channels, or synaptic connections. The units (e.g., the units 106 in FIG. 1) providing inputs to a given unit via, for example, connections 104 may be commonly referred to as the pre-synaptic units, while the unit receiving the inputs (e.g., the units 102 in FIG. 1) may be referred to as the post-synaptic unit. The post-synaptic unit of one unit layer (e.g. the units 102 in FIG. 1) may act as the pre-synaptic unit for the subsequent upper layer of units (not shown).

Individual ones of the connections (104, 112 in FIG. 1) may be assigned, inter alia, a connection efficacy. Generally speaking, a connection efficacy may refer to a magnitude and/or probability of influence of pre-synaptic spike to firing of post-synaptic neuron. A connection efficacy may comprise, for example, a parameter such as a synaptic weight by which one or more state variables of post synaptic unit may be changed. During operation of the pulse-code network (e.g., the network 100), synaptic weights may be adjusted using what is referred to as the spike-timing dependent plasticity (STDP) in order to implement, among other things, network learning.

Figure 2:
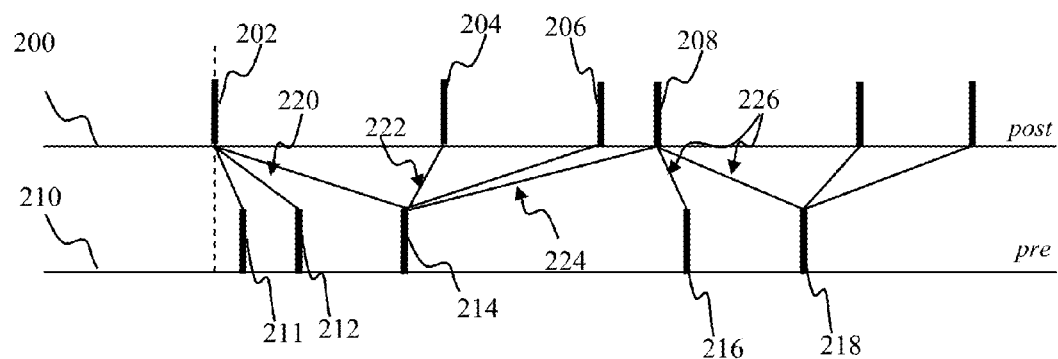
FIG. 2 is a graphical illustration depicting spike timing in the spiking network of FIG. 1, according to some implementations.
Figure 3:
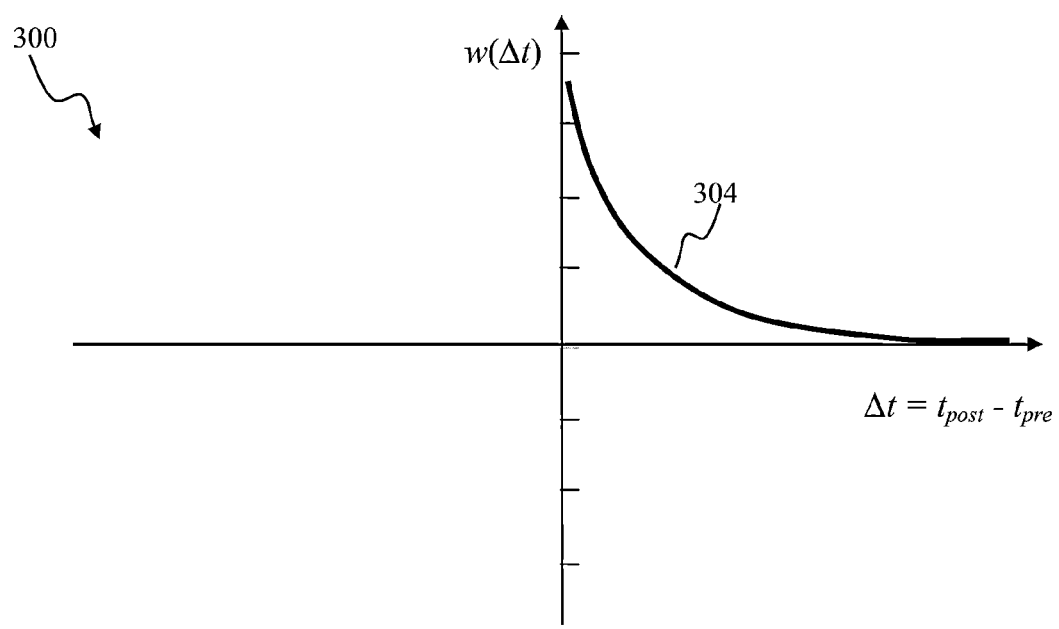
FIG. 3 is a plot depicting spike time dependent plasticity spike timing in the spiking network of FIG. 1, according to some implementations.

One adaptation mechanism is illustrated with respect to FIGS. 2-3. Traces 200, 210 in FIG. 2 depict an exemplary pre-synaptic input spike train (e.g., delivered via connection 104_1 in FIG. 1) and an exemplary post synaptic output spike train (e.g., generated by the neuron 102_1 in FIG. 1), respectively.

One or more properties of the connections 104 (e.g., weight w) may be adjusted based on relative timing between the pre-synaptic input (e.g., the pulses 202, 204, 206, 208 in FIG. 2) and post-synaptic output pulses (e.g., the pulses 214, 216, 218 in FIG. 2). One typical STDP weight adaptation rule is illustrated in FIG. 3, where rule 300 depicts synaptic weight change $\Delta w$ as a function of time difference between the time of post-synaptic output generation and arrival of pre-synaptic input $\Delta t = t_{post} - t_{pre}$. In some implementations, synaptic connections (e.g., the connections 104 in FIG. 1) delivering pre-synaptic input prior to the generation of post-synaptic response may be potentiated (as indicated by $\Delta w > 0$ associated with the curve 302), while synaptic connections (e.g., the connections 104 in FIG. 1) delivering pre-synaptic input subsequent to the generation of post-synaptic response may be depressed (as indicated by $\Delta w < 0$ associated with the curve 304 in FIG. 3). By way of illustration, when the post-synaptic pulse 208 in FIG. 2 is generated: (i) connection associated with the pre-synaptic input 214 may precede the output pulse (indicated by the line denoted 224) and it may be potentiated (Δw>0 in FIG. 3 and the weight is increased); and (ii) connections associated with the pre-synaptic input 216, 218 that follow may be depressed (Δw<0 in FIG. 3 and the weights are decreased).

Generalized dynamics equations for spiking neurons models may be expressed as a superposition of input, interaction between the input current and the neuronal state variables, and neuron reset after the spike, as follows:

$$\frac{d\vec{q}}{dt} = V(\vec{q}) + \sum_{t^{out}} R(\vec{q})\delta(t - t^{out}) + G(\vec{q})I^{ext} \qquad \text{(Eqn. 1)}$$

where:
- $\vec{q}$ is a vector of internal state variables (e.g., comprising membrane voltage);
- $I^{ext}$ is external input into neuron;
- V is the function that defines evolution of the state variables;
- G describes the interaction between the input current and the state variables (for example, to model postsynaptic potentials); and
- R describes resetting the state variables after the output spikes at $t^{out}$.

According to some implementations, for IF model the state vector and the state model may be expressed as:

$$\vec{q}(t) \equiv u(t); V(\vec{q}) = -Cu; R(\vec{q}) = u_{res}; G(\vec{q}) = 1, \qquad \text{(Eqn. 2)}$$

where C is a membrane constant and $u_{res}$ is a value to which voltage is set after output spike (reset value). Accordingly, Eqn. 1 may become:

$$\frac{du}{dt} = -Cu + \sum_{t^{out}}(u_{refr} - u)\delta(t - t^{out}) + I^{ext} \qquad \text{(Eqn. 3)}$$

For a simple neuron model, Eqn. 1 may be expressed as:

$$\frac{dv}{dt} = 0.04v^2 + 5v + 140 - u + \sum_{t^{out}}(c - v)\delta(t - t^{out}) + I^{ext} \qquad \text{(Eqn. 4)}$$

$$\frac{du}{dt} = -a(bv - u) + d\sum_{t^{out}}\delta(t - t^{out})$$

where:

$$q(t) \equiv \begin{pmatrix} v(t) \\ u(t) \end{pmatrix}; V(q) = \begin{pmatrix} 0.04v^2(t) + 5v(t) + 140 - u(t) \\ a(bv(t) - u(t)) \end{pmatrix}; \qquad \text{(Eqn. 5)}$$

$$R(q) = \begin{pmatrix} c - v(t) \\ d \end{pmatrix}; G(q) = \begin{pmatrix} 1 \\ 0 \end{pmatrix}$$

and a, b, c, d are parameters of the model.

Some algorithms for spike-time learning in spiking neural networks may be represented using the following general equation described, for example, in co-pending and co-owned U.S. patent application Ser. No. 13/487,499 entitled "STOCHASTIC APPARATUS AND METHODS FOR IMPLEMENTING GENERALIZED LEARNING RULES", incorporated supra:

$$\frac{d\theta_i(t)}{dt} = \eta F(t)e_i(t) \qquad \text{(Eqn. 6)}$$

where:
- $\theta_i(t)$ is an adaptation (learning) parameter of a synaptic connection between the pre-synaptic neuron i and the post-synaptic neuron j;
- η is a parameter referred to as the learning rate;
- F(t) is a performance function; and
- $e_i(t)$ is eligibility trace, configured to characterize relations between pre-synaptic and post-synaptic activity.

An exemplary eligibility trace may comprise a temporary record of the occurrence of an event, such as visiting of a state or the taking of an action, or a receipt of pre-synaptic input. The trace may mark the parameters associated with the event (e.g., the synaptic connection, pre- and post-synaptic neuron IDs) as eligible for undergoing learning changes. In some implementations, when a reward signal occurs, only eligible states or actions may be 'assigned credit' or 'blamed' for the error. The eligibility traces may aid in bridging the gap between the events and the training information.

Figure 4:
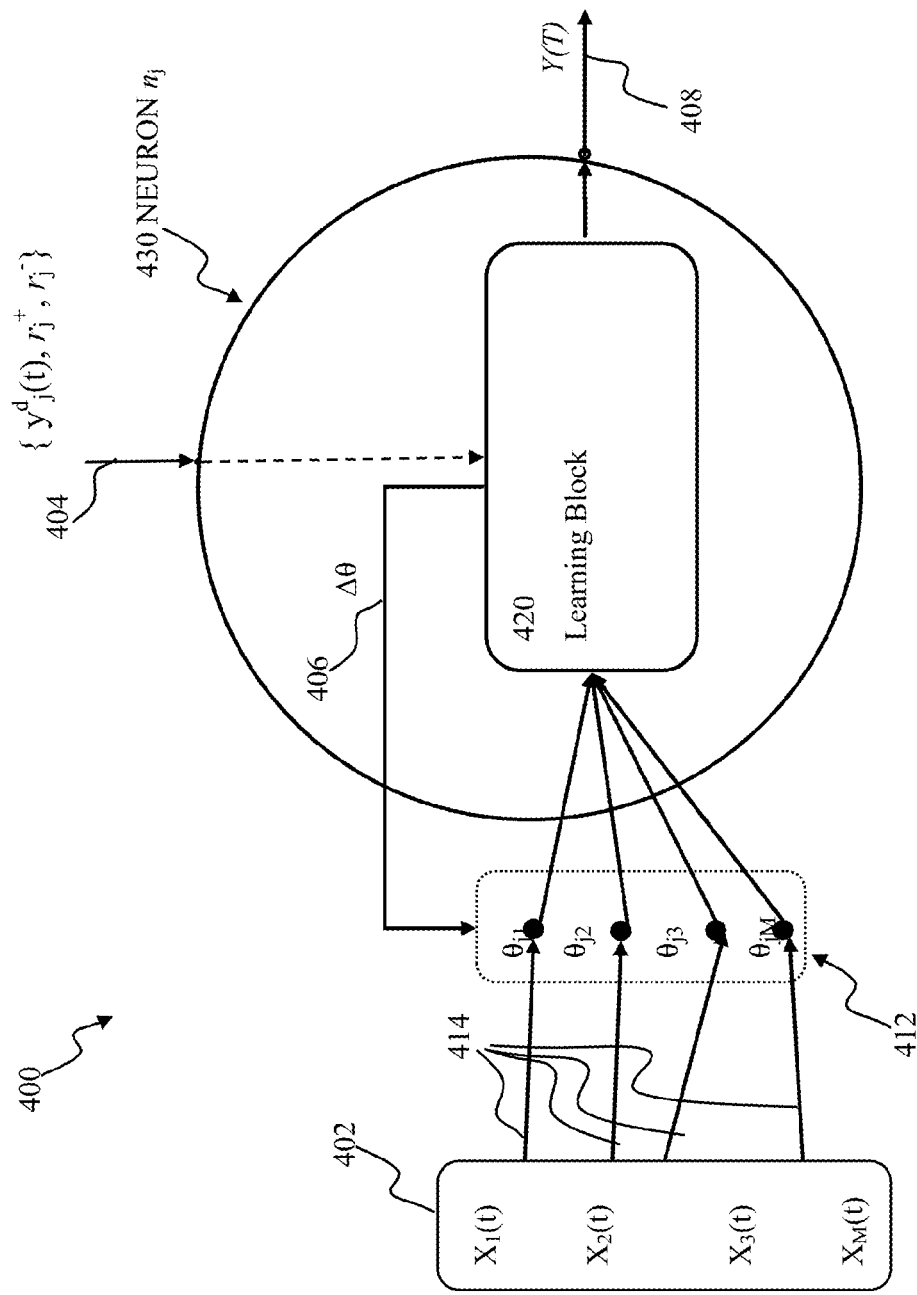
FIG. 4 is a block diagram illustrating a spiking neural network configured to effectuate state-dependent learning, in accordance with one or more implementations.

Referring now to FIG. 4, one implementation of spiking network apparatus for effectuating the generalized learning framework of the disclosure is shown and described in detail. The network 400 may comprise at least one stochastic spiking neuron 430. The stochastic spiking neuron 430 may be operable according to, for example, a Spike Response Process (SRP). The stochastic spiking neuron 430 may be configured to receive M-dimensional input spiking stream X(t) 402 via M-input connections 414. In some implementations, the M-dimensional spike stream may correspond to M-input synaptic connections into the neuron 430. As shown in FIG. 4, individual input connections may be characterized by a learning parameter 412 $\theta_{ij}$ that may be configured to be adjusted during learning. In one or more implementations, the connection parameter may comprise connection efficacy (e.g., weight w). In some implementations, the parameter 412 may comprise synaptic delay. Synaptic delay may characterize a propagation delay of spikes between a pre-synaptic neuron and a post-synaptic neuron via a synaptic connection. The delay may correspond to a hardware property of the connections (e.g., transmission line delay) and/or a software property of the connection. In some implementations, the parameter 412 may comprise probability of synaptic transmission. The transmission probability may be configured between 0 and w and be used to describes a likelihood of a spike (being delivered via the connection) reaching the destination (e.g., post-synaptic neuron).

The following signal notation may be used in describing operation of the network 400, below:
- $y(t) = \Sigma_k \delta(t - t_k^{out})$ denotes the output spike pattern, corresponding to the output signal 408 produced by the learning block 420, where $t_k$ denotes the times of the output spikes generated by the neuron; and
- $y^d(t) = \Sigma_{t_k} \delta(t - t_k^d)$ denotes the teaching spike pattern, corresponding to the desired (or reference) signal that is part of external signal 404 of FIG. 4, where $t_k^d$ denotes the times when the spikes of the reference signal may be received by the neuron.

In some implementations, the neuron 430 may be configured to receive training inputs. The training inputs may comprise the desired output (reference signal) $y^d(t)$ via the connection 404. In some implementations, the neuron 430 may be configured to receive positive and negative reinforcement signals via the connection 404. Parameters $r^+$, $r^-$ in of FIG. 4 may denote the reinforcement signal spike stream, which may be expressed as:

$$r^+(t)=\Sigma_i\delta(t-t_i^+), r^-(t)=\Sigma_i\delta(t-t_i^-),$$

where $t_i^+$, $t_i^-$ denote the spike times associated, for example, with positive and negative reinforcement, respectively.

The neuron 430 may comprise a learning block 420. The learning block 420 may implement learning and/or determine changes of the learning parameters (e.g., connection weights). The learning block 420 may receive an input signal x. The learning block 420 may generate an output signal y. The output signal y may include motor control commands configured to move a robotic arm along a desired trajectory. The learning block 420 may be operated in accordance with a learning process characterized by internal state variables q. The internal state variable q may include, for example, a membrane voltage of the neuron, conductance of the membrane, and/or other variables. The control block 420 may be configured to determine changes to learning parameters θ. The learning parameters θ to be changed may include one or more of synaptic weights of the connections, firing threshold, resting potential of the neuron, and/or other parameters. In one or more implementations, the parameters θ may comprise probabilities of signal transmission between the units (e.g., neurons) of the network. The changes Δθ to the learning parameters may be provided via pathway 406. The changes Δθ to the learning parameters may be used to update the parameters 412 in FIG. 4.

The input signal x(t) may comprise data used for solving a particular control task. In one or more implementations, such as those involving a robotic arm or autonomous robot, the signal x(t) may comprise a stream of raw sensor data and/or preprocessed data. Raw sensor data may include data conveying information associated with one or more of proximity, inertial, terrain imaging, and/or other information. Preprocessed data may include data conveying information associated with one or more of velocity, information extracted from accelerometers, distance to obstacle, positions, and/or other information. In some implementations, such as those involving object recognition, the signal x(t) may comprise an array of pixel values in the input image, or preprocessed data. Pixel data may include data conveying information associated with one or more of RGB, CMYK, HSV, HSL, grayscale, and/or other information. Preprocessed data may include data conveying information associated with one or more of levels of activations of Gabor filters for face recognition, contours, and/or other information. In one or more implementations, the input signal x(t) may comprise desired a motion trajectory. The motion trajectory may be used to predict a future state of the robot on the basis of a current state and a desired motion.

The learning process of the block 420 of FIG. 4 may comprise a probabilistic dynamic process. The probabilistic dynamic process may be characterized by an analytical input-output (x→y) probabilistic relationship having a conditional probability distribution associated therewith:

$$P=p(y|x,\theta). \quad\quad\quad (\text{Eqn. 7})$$

In Eqn. 7, parameter θ may denote various system parameters including connection efficacy, firing threshold, resting potential of the neuron, and/or other parameters. The analytical relationship of Eqn. 7 may be selected such that the gradient of ln [p(y|x,w)] with respect to the system parameter w exists and can be calculated. The neuronal network shown in FIG. 4 may be configured to estimate rules for changing the system parameters (e.g., learning rules) so that the performance function F(x,y,r) may be minimized (or maximized) for the current set of inputs and outputs and system dynamics.

In some implementations, the control performance function may be configured to reflect the properties of inputs and outputs (x,y). The values F(x,y,r) may be calculated directly by the learning block 420 without relying on external signal r when providing solution of unsupervised learning tasks.

In some implementations, the value of the function F may be calculated based on a difference between the output y of the learning block 420 and a reference signal $y^d$ characterizing the desired control block output. This configuration may provide solutions for supervised learning tasks, as described in detail below.

In some implementations, the value of the performance function F may be determined based on the external signal r. This configuration may provide solutions for reinforcement learning tasks, where r represents reward and punishment signals from the environment.

In some implementations, the learning block 420 may be configured to implement learning framework described, for example, in co-pending and co-owned owned U.S. patent application Ser. No. 13/487,533, entitled "STOCHASTIC SPIKING NETWORK LEARNING APPARATUS AND METHODS" filed Jun. 4, 2012, which may enable generalized learning methods without relying on calculations of the performance function F derivative in order to solve unsupervised, supervised, and/or reinforcement learning tasks.

In one or more implementations, the learning block 420 may optimize performance of the control system (e.g., the network 400 of FIG. 4) that may be characterized by minimization of the average value of the performance function F(x,y,r) as described in detail below.

Optimization of performance of the control system (e.g., the network 430 of FIG. 4) may, in some implementations, be achieved via maximization of the average of the performance function, as described in detail for example, in a co-owned and co-pending U.S. patent application Ser. No. 13/487,499 entitled "STOCHASTIC APPARATUS AND METHODS FOR IMPLEMENTING GENERALIZED LEARNING RULES, incorporated supra.

In one or more implementations, instantaneous probability density of the neuron producing a response may be determined using neuron membrane voltage u(t) for continuous time chosen as an exponential stochastic threshold:

$$\lambda(t)=\lambda_o e^{-\kappa(u(t)-u_{th})}, \quad\quad\quad (\text{Eqn. 8})$$

where:
u(t) is the membrane voltage of the neuron,
$u_{th}$ is the voltage threshold for generating a spike,
κ is the probabilistic parameter, and
$\lambda_o$ is the basic (spontaneous) firing rate of the neuron.

For discrete time steps $t_i$, an approximation for the probability $\Lambda(u(t_i))\in(0,1]$ of firing in the current time step may be given by:

$$\Lambda(u(t_i))=1-e^{-\lambda(u(t_i)-u_{th})\Delta t}, \quad\quad\quad (\text{Eqn. 9})$$

where Δt is time step length.

In one or more implementations, the learning rate η may be modulated based on a state q of the post-synaptic neuron j:

$$\frac{d\theta_i(t)}{dt} = (S_d(t) - S_j(t))e_i(t)\eta(q_j(t)),\qquad\text{(Eqn. 10)}$$

where:
- $S_d(t)$ is the teaching signal spike train for the post-synaptic neuron;
- $S_j(t)$ is the output spike train of the post-synaptic neuron;
- $\theta_i(t)$ is an adaptation (learning) parameter of a synaptic connection between the pre-synaptic neuron i and the post-synaptic neuron j;
- η is the state-dependent learning rate; and
- $e_i(t)$ is eligibility trace, configured to characterize relations between pre-synaptic and post-synaptic activity.

In one or more implementations of a leaky integrate and fire (LIF) (e.g., described above with respect to Eqn. 2) and/or spike response process (SR) neuron process, membrane potential (u(t)) and/or firing threshold ($u_{th}(t)$) may be used for learning updates.

In one or more implementations of, for example, Izhikevich neuron process (e.g., described above with respect to Eqn. 5) membrane potential (denoted as u(t)) and current (denoted as v(t)) may be used.

In one or more implementations of, for example, Hodgkin-Huxley neuron process parameters u(t), m(t), h(t), n(t) may be used. The parameters m(t), n(t), h(t) may describe, for example, probabilities of the respective (Na, K, and leaking) ion channels being open.

In one or more implementations, the learning rate function $\eta(q_j(t))$ of Eqn. 10 may be based on a likelihood of the post-synaptic neuron generating the response. In some implementations, the likelihood may be determined based on proximity measure between the current neuron state and the state of the neuron at which one considers a neuron to be firing a spike (e.g., super threshold state).

As shown by Eqn. 10, the teaching signal activity $S_d(t)$ may be configured to cause positive adjustment of the learning parameter $\theta_i(t)$ (e.g., potentiate the connection i). The post-synaptic signal activity $S_j(t)$ may be configured to cause negative adjustment of the learning parameter $\theta_i(t)$ (e.g., depress the connection i).

In one or more implementations of the LIF and/or SR neuron processes, the proximity may be based on a distance measure D comprising determination of an absolute value of the scalar difference of the current neuron excitability (e.g., the membrane potential u(t)) and the threshold excitability (e.g., the threshold potential $u_{th}$) as follows:

$$\eta(t) = \eta_0 D(|u(t) - u_{th}(t)|).\qquad\text{(Eqn. 11)}$$

The learning rule of Eqn. 10 may be expressed:

$$\frac{d\theta_i(t)}{dt} = \eta_0 (S_d(t) - S_j(t))e_i(t)D(|u(t) - u_{th}|).\qquad\text{(Eqn. 12)}$$

The learning rule of Eqn. 12 may be understood as follows: when the neuron excitability is close to the threshold (e.g., $|u(t) - u_{th}(t)| \sim 1$, also referred to as the near-threshold state) prior to the arrival of pre-synaptic input, the input that causes the neuron to respond (e.g., fire a spike) may be potentiated by a smaller amount, compared to the input that is capable of causing the neuron in a deep sub-threshold state (e.g., $|u(t) - u_{th}(t)| \ll 1$) to respond to the input.

In one or more implementations, the state dependent learning rate may be configured using an exponential mapping of the scalar difference of the current neuron excitability and the threshold excitability, as follows:

$$\frac{d\theta_i(t)}{dt} = \eta_0 (S_d(t) - S_j(t))e_i(t)[1 - B\exp(-\beta(u_{th} - \hat{u}(t)))],\qquad\text{(Eqn. 13)}$$

where:
- $\eta_0$ is base learning rate;
- $\hat{u}(t)$ is state parameter history;
- B is a saturation level parameter; and
- β is a gain parameter.

In some implementations, the normalization parameter may be configured based on the response threshold $u_{th}$ and reset value $u_{res}$ of the state parameter u(t) as follows:

$$\beta = \frac{1}{u_{th} - u_{res}}.\qquad\text{(Eqn. 14)}$$

The reset value $u_{res}$ may be configured to be smaller than the threshold $u_{th}$. The threshold $u_{th}$ may be configured between 0 and 1, and reset value $u_{res}$ may be configured between −1 and 1, such as 0, in some implementations.

In one or more implementations the base learning rate $\eta_0$ may be selected between 50 and 2500, such as 550. The parameter B may be selected from the range between 0 and 1, such as 0.98.

In one or more implementations, the state parameter history $\hat{u}(t)$ may be determined based on a low-pass filtered state parameter as:

$$\hat{u}(t) = \int_0^\tau u(t)dt,\qquad\text{(Eqn. 15)}$$

where the filter time constant τ may be selected from the range between 1 ms and 10 ms. For example, the filter time may be selected as 3 ms, in some implementations. In some implementations, the state parameter history $\hat{u}(t)$ may be determined based on a running average, block average, weighted average and/or other parameters.

In some implementations, such as, for example, Hodgkin-Huxley model, the proximity measure between the current neuron state and the state super-threshold state may be determined using a Euclidean distance between the current state vector and the state vector representing the super-threshold state.

In one or more implementations of a stochastic neuron process, such as described, for example, in U.S. patent application Ser. No. 13/487,533, entitled "STOCHASTIC SPIKING NETWORK LEARNING APPARATUS AND METHODS", incorporated supra, the state parameter q may comprise a probability p(t) of the post-synaptic neuron j generating a response (e.g., firing) at a given time $t_{response}$ so that the rule of Eqn. 10 may be expressed as:

$$\frac{d\theta_i(t)}{dt} = (S_d(t) - S_j(t))e_i(t)\eta(p_j(t)),\qquad\text{(Eqn. 16)}$$

where:
- $p_j(t)$ is the probability of firing; and
- η is a function configured such that when $p_j(t)$ is high (e.g., close to 1) the value of $\eta(p_j(t))$ is low (e.g., close to 0), and when $p_j(t)$ is low (e.g., close to 0) value of $\eta(p_j(t))$ is high (e.g., close to 1).

In one or more implementations, the learning rate function η may comprise a monotonous function of $p_j(t)$ mapping probability range [0,1] onto learning rate range [1,0].

In some implementations, the exponential stochastic thresholds of Eqn. 8-Eqn. 9 may be used in order to normalize a distance between the current state and the threshold state to the range [0, 1] as follows:

$$\eta(t)=1-\lambda(t), \text{ and} \qquad (\text{Eqn. 17})$$

$$\eta(t_i)=1-\Lambda(t_i). \qquad (\text{Eqn. 18})$$

State-dependent learning in stochastic neurons may be implemented using Eqn. 17, Eqn. 18 for continuous time systems and discrete time systems, respectively.

Figure 5:
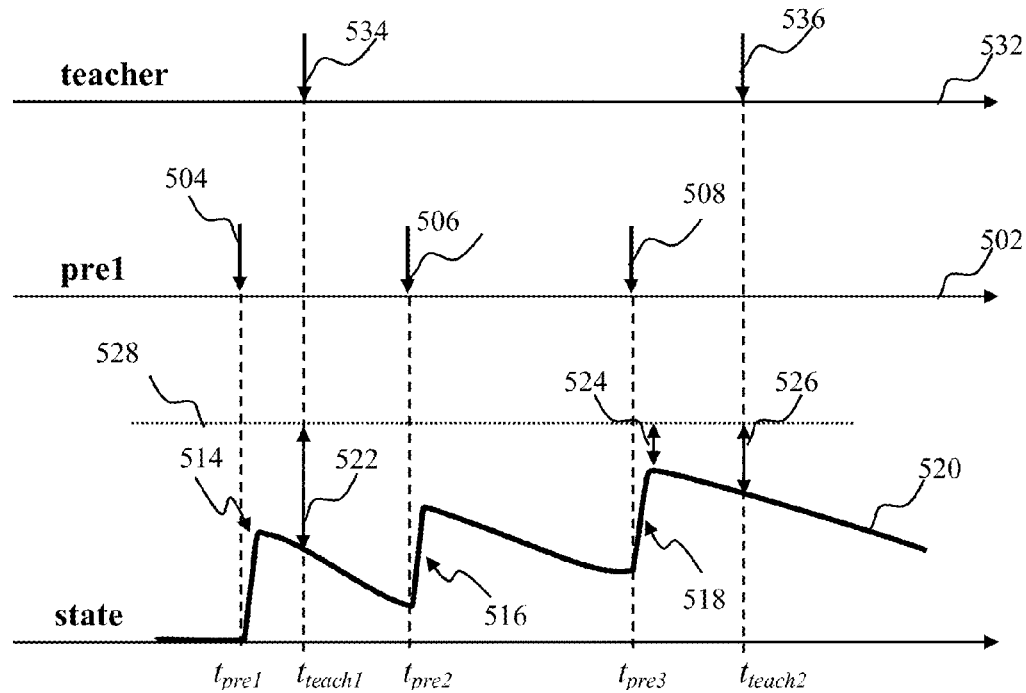
FIG. 5 is a graphical illustration depicting state determination based on neuron input for use with the state-dependent learning, in accordance with one or more implementations.
Figure 6:
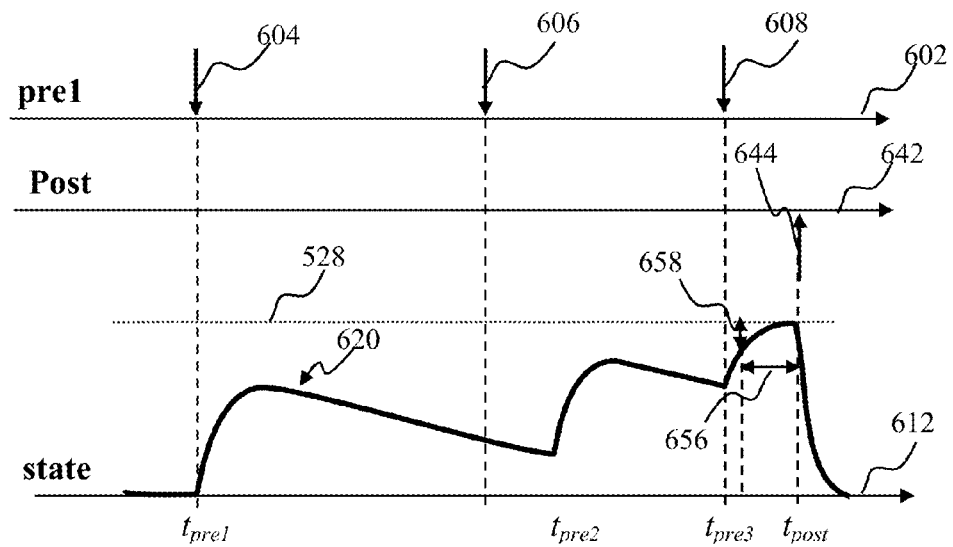
FIG. 6 is a graphical illustration depicting state determination based on neuron response for use with the state-dependent learning, in accordance with one or more implementations.

FIGS. 5-6 illustrate methodology of determining state-dependent learning parameter adjustment, such as described by Eqn. 10, Eqn. 12, Eqn. 16 described above.

FIG. 5 depicts learning based on an input event for use, for example, with a neuron 430 of FIG. 4. In some implementations, the event may comprise occurrence of a teaching input (e.g., the input 404 in FIG. 4). In one or more implementations, the event may comprise occurrence of a pre-synaptic input (e.g., the input 402 in FIG. 4).

The traces 502, 532 in FIG. 5 depict pre-synaptic activity and teaching input activity, respectively. The curve 520 depicts a neuron state parameter (e.g., excitability) that may be determined based on the pre-synaptic and/or the teaching input.

The pre-synaptic activity may comprise one or more spikes. Such spikes may be denoted by arrows 504, 506, 508 at times $t_{pre1}$, $t_{pre2}$, $t_{pre3}$ in FIG. 5. When the neuron receives the pre-synaptic input 502, the neuron state may be updated, as depicted by the excitability 520 increases denoted by the arrows 514, 516, 518 in FIG. 5. The neuron state parameter may be configured to decay with time so as to effectuate, for example, LIF neuron process. The broken line 528 denotes neuron firing threshold. When the excitability 520 breaches the level 528, the neuron may generate post-synaptic response. A weaker input may not evoke a response, in which case such input is referred to as the 'sub-threshold'.

Those skilled in the art will recognize that the threshold may not be a fixed value. In some implementations of the neuron process, the response-generating threshold 528 may be dynamically changing and/or state dependent. For example, for multidimensional neural models, the firing threshold may correspond to a manifold in the phase space of the neuron. In one implementation, a particular input may either (i) evoke a spike depending on the history and state of the neuron; or (ii) adjust neuronal state without causing firing of the spike. For example, a class of neural models, referred to as resonators, may exhibit intrinsic oscillations. In the implementations of oscillatory or resonator neuronal models, even weak input, when applied at a resonant frequency of the neuron, may evoke spiking response, while other inputs (e.g., even greater in magnitude, but applied out of phase and/or at a wrong frequency) may not evoke post synaptic responses.

The teaching activity may comprise one or more teaching spikes (e.g., denoted by arrows 534, 536 at times $t_{teach1}$, $t_{teach2}$ in FIG. 5). In some implementations, the teaching input may comprise supervisor signal configured to implement supervised learning. In one or more implementations, the teaching input may comprise reinforcement signal configured to implement reinforcement learning.

When the teaching input occurs, efficacy of one or more connections (e.g., the connections 414 in FIG. 4) providing the input 502 to the neuron may be updated. The update may comprise a connection weight change that is configured based on a distance between the neuron state at time of the teaching input (e.g., $t_{teach1}$, $t_{teach2}$) and the threshold 528. As shown in FIG. 5, the neuron state 520 at time $t_{teach1}$ of the teaching input 534 is lower, compared to the neuron state 520 at time $t_{teach2}$ (associated with the teaching input 536). The state distance 522 corresponding to the teaching input 534 may be greater compared to the state distance 526 corresponding to the teaching input 536. In some implementations, in accordance with, for example, Eqn. 12, weight change caused by the teaching input 534 may exceed weight change associated with the teaching input 536.

FIG. 6 depicts state-dependent learning based on an output event for use, for example, with the neuron 430 of FIG. 4. In some implementations, the output event may correspond to a post-synaptic output by the neuron (e.g., the output 408 in FIG. 4).

The traces 602, 642 in FIG. depict pre-synaptic input activity and post-synaptic (output) activity, respectively. The curve 620 depicts the neuron state parameter time history. In one or more implementations, the time history of curve 620 may be configured using a low-pass filtered neuron excitability (e.g., via Eqn. 15).

The pre-synaptic activity may comprise one or more spikes (e.g., denoted by arrows 606, 608 at times $t_{pre1}$, $t_{pre2}$ in FIG. 6). When the neuron receives pre-synaptic input 602, the neuron state may be updated, as depicted by the state level 620 increases in FIG. 6.

Once the state parameter 620 reaches the threshold 528, a post-synaptic response may be generated by the neuron, as denoted by the arrow 644 at time $t_{post}$ in FIG. 6.

When the neuron generates the output (e.g., the spike 644 in FIG. 6), efficacy of one or more connections (e.g., the connections 414 in FIG. 4) providing the input 602 to the neuron may be updated. In one or more implementations, a history of the neuron state parameter may be used in order to implement state-dependent learning. By way of a non-limiting example, a value of the neuron state history at a time τ prior to $t_{post}$ may be used. In some implementation, the time interval τ (656 in FIG. 6) may correspond to the time constant of the low pass filter and/or averaging window used to determine history of the neuron state. The state dependent learning may be effectuated based on a distance 658 between the neuron state history and the threshold 528.

FIGS. 7A-9 illustrate methods of state-dependent learning parameter updates for a neuron of a neural network in accordance with one or more implementations. The operations of methods FIGS. 7A-9 described below are intended to be illustrative. In some implementations, methods 700, 710, 720, 800, and/or 900 may be accomplished with one or more additional operations not described, and/or without one or more of the operations discussed. Additionally, the order in which the operations of methods are illustrated in FIGS. 7A-9 and described below is not intended to be limiting.

In one or more implementations, methods of FIGS. 7A-9 may be carried out by one or more processing devices (e.g., a digital processor, an analog processor, a digital circuit designed to process information, an analog circuit designed to process information, a state machine, and/or other mechanisms for electronically processing information). The some processing devices may include one or more devices executing some or all of the operations of method 700, 710, 720, 800, and/or 900 in response to instructions stored electronically on an electronic storage medium. The one or more processing devices may include one or more devices configured through hardware, firmware, and/or software to be specifically designed for execution of one or more of the operations of methods 700, 710, 720, 800, and/or 900.

Figure 7A:
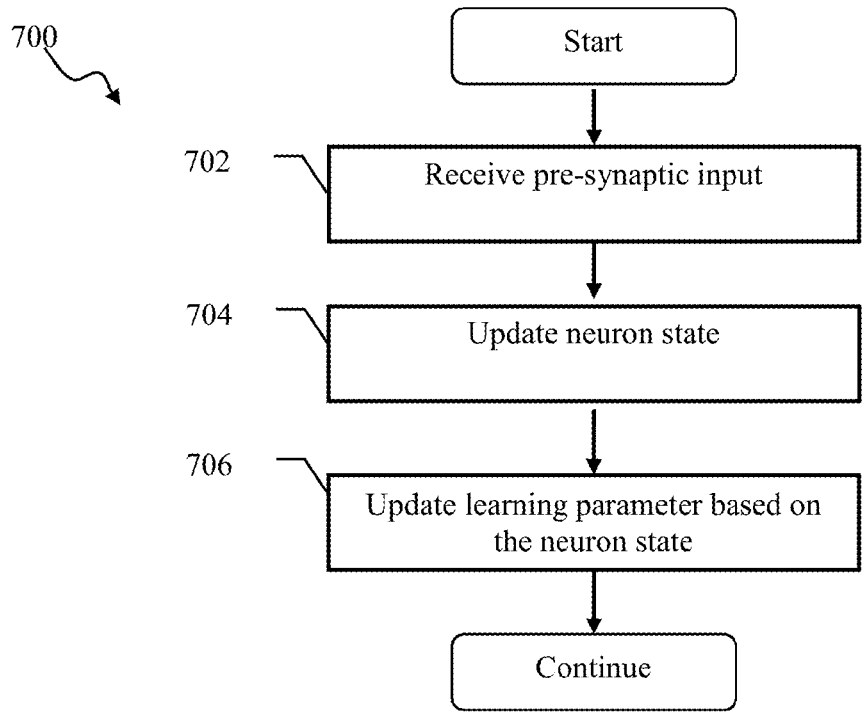
FIG. 7A is a logical flow diagram illustrating state-dependent connection update based on pre-synaptic input for use with the neural network of FIG. 4, in accordance with one or more implementations.

Referring now to FIG. 7A one exemplary implementation of the state-dependent connection efficacy update method of the disclosure for use with, for example, the neuron 430 of FIG. 4 is described in detail.

At step 702 of method 700, pre-synaptic input may be received by the neuron. The pre-synaptic input may comprise data x(t) used for solving a particular control task. In one or more implementations, such as those involving a robotic arm or autonomous robot, the signal x(t) may comprise a stream of raw sensor data and/or preprocessed data. In some implementations, such as those involving object recognition, the signal x(t) may comprise an array of pixel values in the input image, or preprocessed data.

At step 704, a neuron state may be updated in accordance with one or more neuron processes (e.g., LIF, SRP, stochastic, and/or other process) as described herein. In one or more implementations, the neuron process may comprise stochastic spike response process of Eqn. 8-Eqn. 9. In some implementations, the neuron process may comprise a deterministic process described, for example by Eqn. 2, Eqn. 5, and/or other appropriate process description.

At step 706, learning parameter may be updated in accordance with the neuron state. In one or more implementations, the learning parameter may comprise input connection efficacy. The update may comprise efficacy adjustment determined using, for example, Eqn. 10, Eqn. 12, Eqn. 13, Eqn. 16 and/or other realizations.

Referring now to FIG. 7A, one exemplary implementation of the state-dependent learning method of the disclosure for use with, for example, the neuron 430 of FIG. 4 is described in detail.

At step 702 of method 700, a pre-synaptic input may be received by the neuron. The pre-synaptic input may comprise data x(t) used for solving a particular control task. In one or more implementations, such as those involving a robotic arm or autonomous robot, the signal x(t) may comprise a stream of raw sensor data and/or preprocessed data. In some implementations, such as those involving object recognition, the signal x(t) may comprise an array of pixel values in the input image, and/or preprocessed data.

At step 704, a neuron state may be updated in accordance with one or more neuron processes (e.g., LIF, SRP, stochastic, and/or other process) as described herein. In one or more implementations, the neuron process may comprise stochastic spike response process of Eqn. 8-Eqn. 9. In some implementations, the neuron process may comprise deterministic process described, for example by Eqn. 2, Eqn. 5, and/or other appropriate process description.

At step 706, a learning parameter may be updated in accordance with the neuron state. In one or more implementations, the learning parameter may comprise an input connection efficacy. The update may comprise an efficacy adjustment determined using, for example, Eqn. 10, Eqn. 12, Eqn. 13, Eqn. 16, and/or other realizations.

Figure 7B:
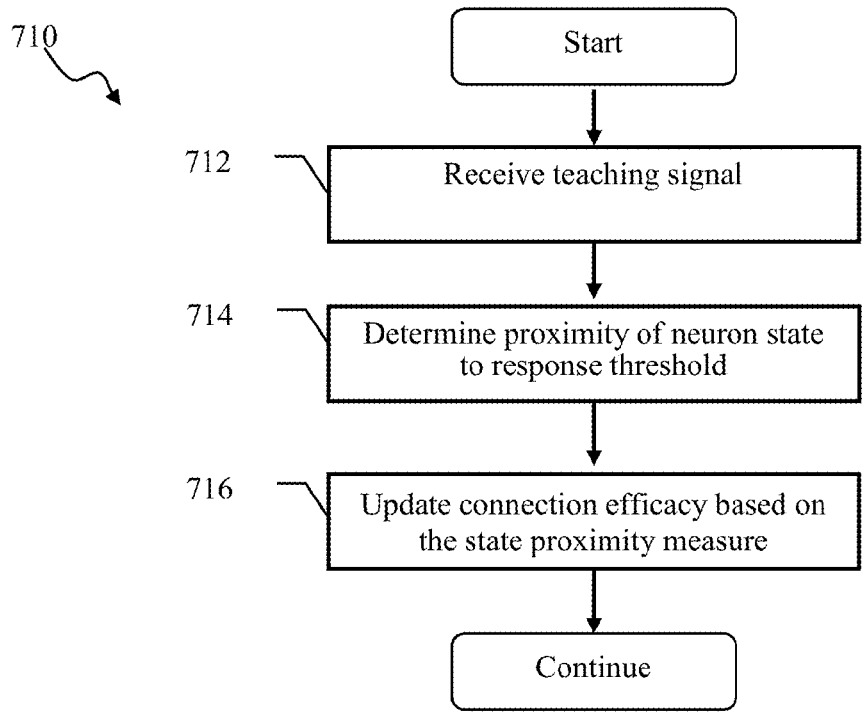
FIG. 7B is a logical flow diagram illustrating state-dependent connection update based on teaching input for use with the neural network of FIG. 4, in accordance with one or more implementations.

FIG. 7B illustrates a method of state-dependent connection efficacy update of the disclosure for use with, for example, network 400 of FIG. 4, in accordance with one or more implementations.

At step 712 of method 710, a teaching input may be received by the neuron. The teaching input may comprise one or more spikes corresponding to the desired (or reference) signal for the neuron.

At step 714, a proximity measure between a current value of neuron state and a response generation threshold (e.g., the threshold 528 in FIG. 5) may be determined. In one or more implementations, the proximity measure may be based on a distance measure (e.g., Eqn. 11) between current state value and a target state. In some implementations of stochastic spiking neuron networks, the proximity measure may be determined using Eqn. 17-Eqn. 18. In some implementations, the target state may correspond to neuron state associated with generating response that is consistent with the teaching signal. The consistency may be determined based on a correlation measure between neuron output and the teaching signal.

At step 716, connection efficacy may be updated in accordance with the proximity measure between the neuron present state and the response threshold. The update may comprise efficacy adjustment determined using, for example, Eqn. 10, Eqn. 12, Eqn. 13, Eqn. 16, and/or other realizations.

Figure 8:
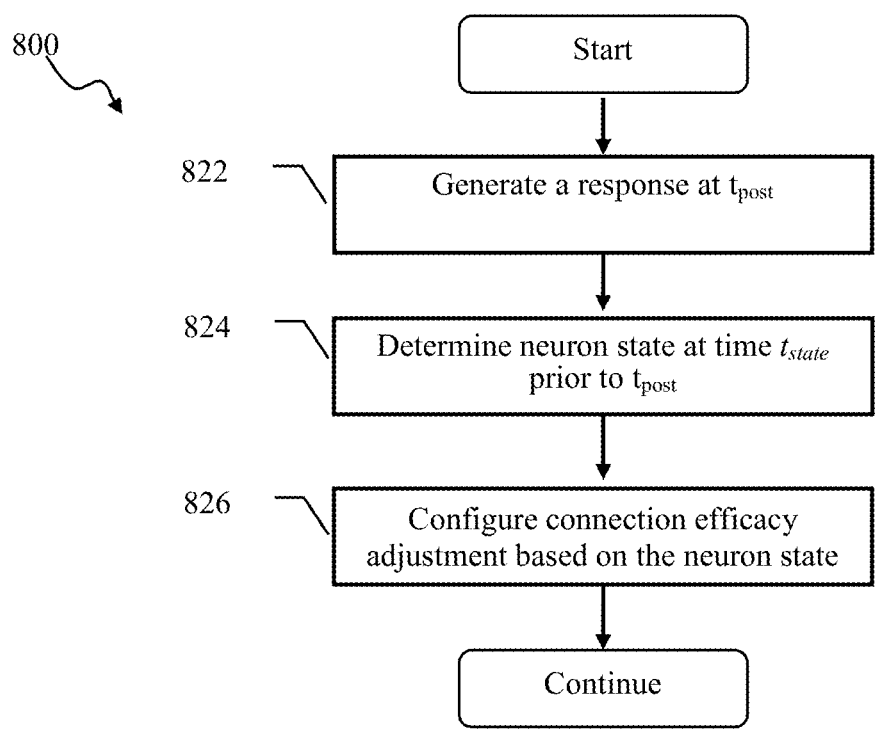
FIG. 8 is a logical flow diagram illustrating state-dependent connection update based on post-synaptic response for use with the neural network of FIG. 4, in accordance with one or more implementations.

FIG. 8 illustrates a method of state-dependent connection efficacy update based on post-synaptic response for use with, for example, network 400 of FIG. 4, in accordance with one or more implementations.

At step 822 of method 820, a response may be generated by, for example, the post-synaptic neuron 430 of FIG. 4. The response may comprise one or more spikes (e.g., the spike 644 of FIG. 6) having a post-synaptic time $t_{post}$ associated therewith. In one or more implementations, the response may be based on neuron excitability (such as, membrane potential and/or probability of firing) breaching the response threshold (e.g., 528 in FIG. 6).

At step 824, a value of neuron state at a time instance $t_{state}$ prior to $t_{post}$ may be determined. In one or more implementations, the prior neuron state value may be determined using a time-history of the state parameter, such as the low pass filter (LPF) described by Eqn. 15. The time interval between $t_{state}$ and $t_{post}$ may correspond to the LPF time constant.

At step 826, connection efficacy adjustment may be configured in accordance with a proximity measure between the neuron prior state and the response threshold. The adjustment may comprise efficacy modification obtained, for example, via Eqn. 10, Eqn. 12, Eqn. 13, Eqn. 16, and/or other realizations.

Figure 9:
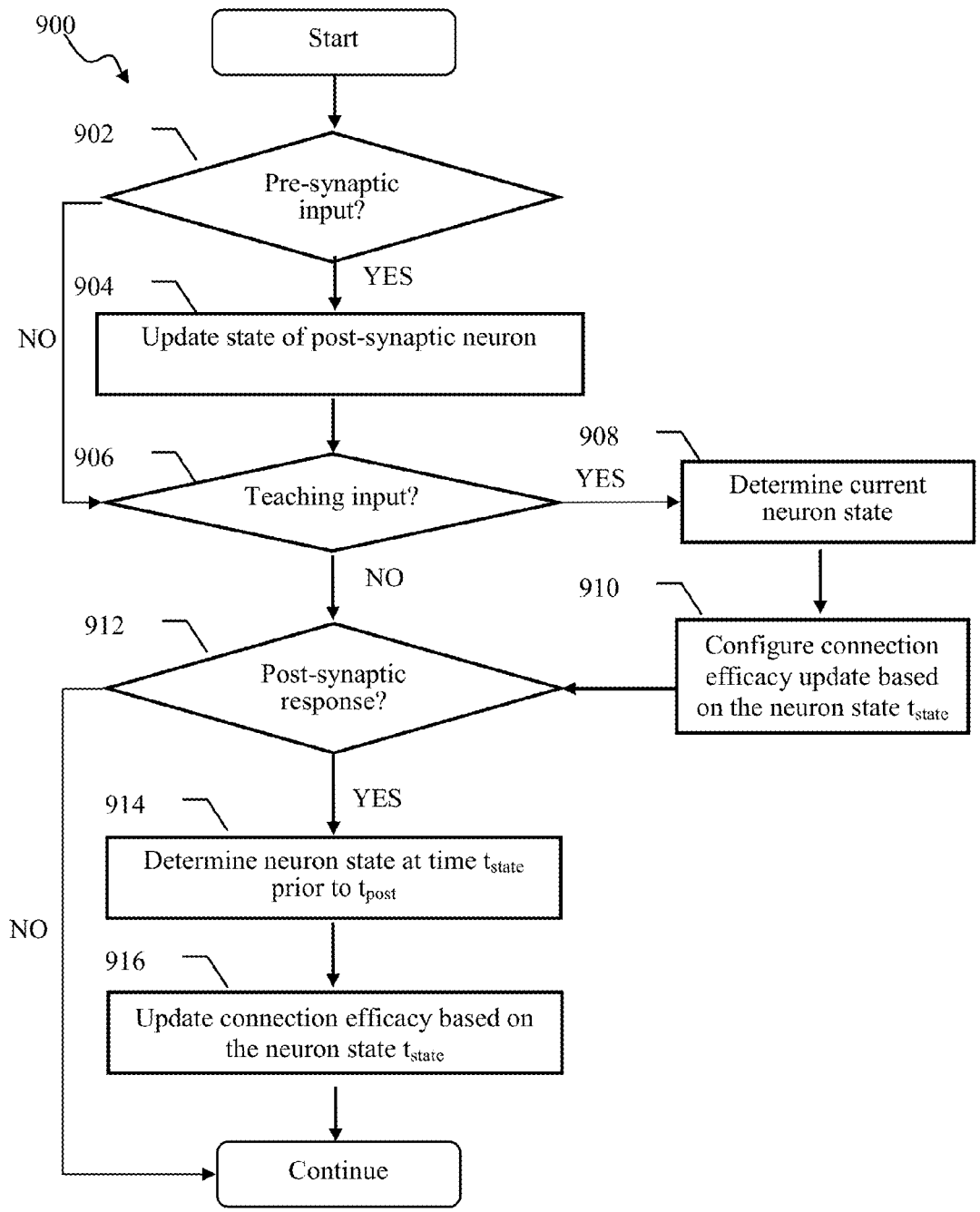
FIG. 9 is a logical flow diagram illustrating a method operation of spiking neuron network of FIG. 4 comprising state-dependent updates, in accordance with one or more implementations.

FIG. 9 illustrates a method of operating a spiking neuron network in accordance with state based update methodology of the disclosure.

At step 902 of method 900, a determination may be made as to whether pre-synaptic input is received by, for example, neuron 430 of FIG. 4.

When the input is present, neuron state may be updated at step 904. In some implementations, the update may comprise neuron excitability adjustment as illustrated, for example, the trace 520 in FIG. 5.

When the pre-synaptic input is not present, the method may proceed to step 906, where a determination may be made as to whether teaching input is present. In one or more implementations, the teaching input may comprise desired spike pattern.

When the teaching input is present, the method may proceed to step 908 where current neuron state may be determined. In one or more implementations, the current neuron state may correspond to neuron excitability and/or probability of neuron response, as described above.

At step 910, efficacy of connections providing pre-synaptic input to the neuron may be adjusted based on the neuron current state. In one or more implementations, the proximity measure may be based on a distance measure (e.g., Eqn. 11) between the current state value and a target state. In some implementations of stochastic spiking neuron networks, the proximity measure may be determined using Eqn. 17-Eqn. 18. In some implementations, the target state may correspond to the neuron state associated with the post-synaptic response that is consistent with the teaching signal.

When teaching input is not present, the method 900 may proceed to step 912 where a determination may be made as to whether a response has been generated by the post-synaptic neuron. In one or more implementations, the response may be based on neuron excitability (such as, membrane potential and/or probability of firing) breaching the response threshold (e.g., 528 in FIG. 6).

When the post-synaptic response has been generated, the method may proceed to step 914, where a value of the neuron state at a time $t_{state}$ prior to the time of the response ($t_{post}$) may be determined.

At step 916, an adjustment for one or more connections configured to provide the pre-synaptic input into the neuron may be determined. In one or more implementations, the efficacy adjustment may be based on a proximity measure between the neuron prior state and the response threshold. The adjustment may comprise efficacy modification obtained, for example, via Eqn. 10, Eqn. 12, Eqn. 13, Eqn. 16, and/or other realizations.

Various exemplary spiking network apparatus comprising one or more of the methods set forth herein (e.g., using the state-dependent learning mechanism explained above) are now described with respect to FIGS. 10-11D.

Figure 10:
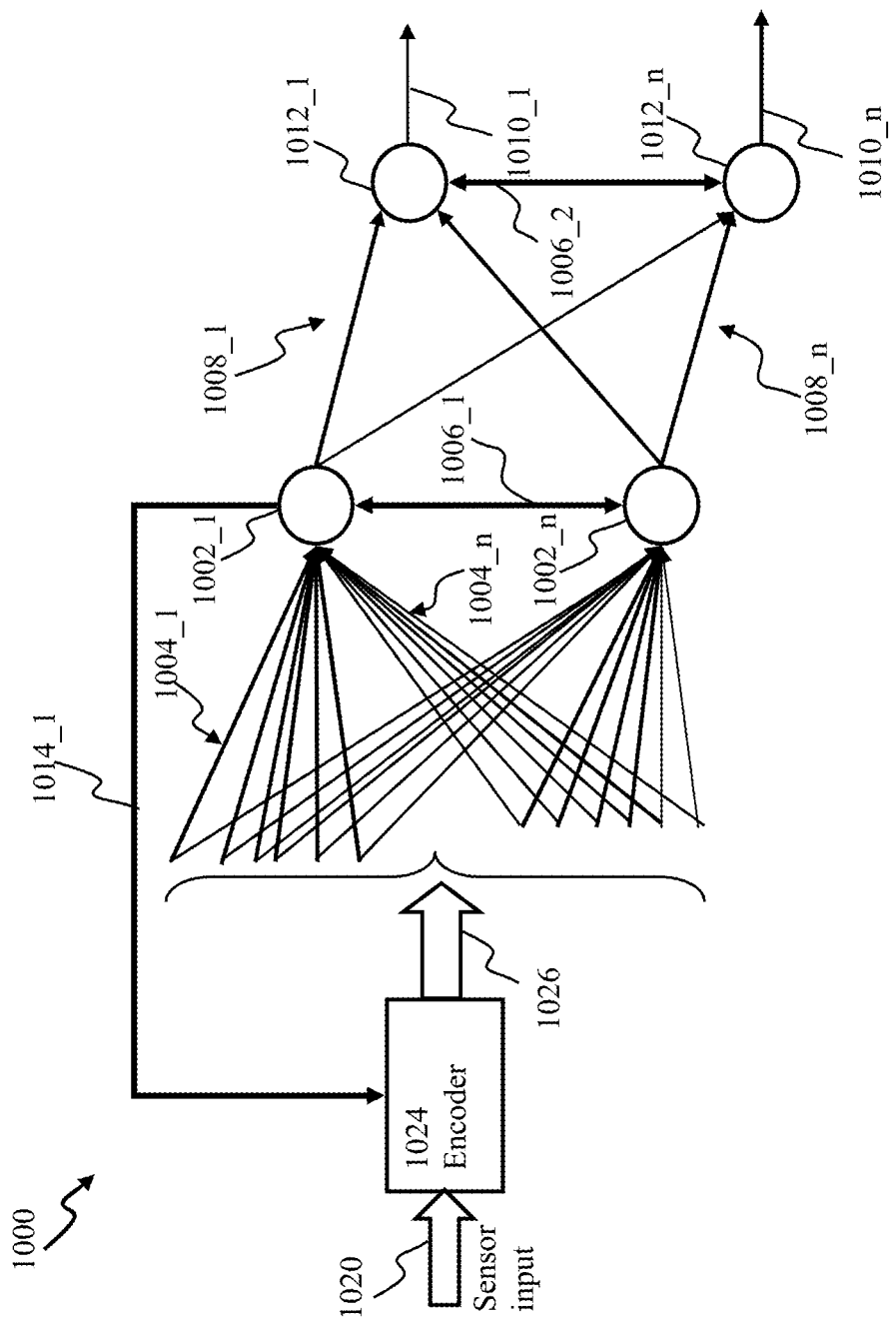
FIG. 10 is a block diagram illustrating sensory processing apparatus configured to implement state-dependent connection plasticity mechanism in accordance with one or more implementations.

One apparatus for processing of sensory information (e.g., visual, audio, somatosensory, and/or other sensory information) using a spiking neural network comprising, for example, the state dependent plasticity mechanism is shown in FIG. 10. The illustrated processing apparatus 1000 may comprise an input interface configured to receive an input sensory signal 1020. In some implementations, this sensory input may comprise electromagnetic waves (e.g., visible light, IR, UV, and/or other wavelength regimes) entering an imaging sensor array. The imaging sensor array may comprise one or more of RGCs, a charge coupled device (CCD), an active-pixel sensor (APS), and/or other types of sensors. The input signal in this case may be a sequence of images (image frames) received from a CCD camera via a receiver apparatus, or downloaded from a file. The image may be a two-dimensional matrix of RGB values refreshed at a 24 Hz frame rate. It will be appreciated by those skilled in the art that the above image parameters are merely exemplary, and many other image representations (e.g., bitmap, CMYK, grayscale, and/or other image representations) and/or frame rates are within the scope of the present disclosure.

The apparatus 1000 may comprise an encoder 1024 configured to transform (e.g., encode) the input signal into an encoded signal 1026. In one implementation, the encoded signal may comprise a plurality of pulses (also referred to as a group of pulses) configured to model neuron behavior. The encoded signal 1026 may be communicated from the encoder 1024 via multiple connections (also referred to as transmission channels, communication channels, or synaptic connections) 1004 to one or more neuronal nodes (also referred to as the detectors) 1002.

In the implementation of FIG. 10, different detectors of the same hierarchical layer may be denoted by a "_n" designator, such that e.g., the designator 1002_1 denotes the first detector of the layer 1002. Although only two detectors (1002_1, 1002_n) are shown in the implementation of FIG. 10 for clarity, it is appreciated that the encoder can be coupled to any number of detector nodes that may be compatible with the detection apparatus hardware and software limitations. A single detector node may be coupled to any practical number of encoders.

In one implementation, individual ones of the detectors 1002_1, 1002_n contain logic (which may be implemented as a software code, hardware logic, or a combination of thereof) configured to recognize a predetermined pattern of pulses in the encoded signal 1004, using for example one or more of the mechanisms described in U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", each incorporated herein by reference in its entirety, to produce post-synaptic detection signals transmitted over communication channels 1008. In FIG. 10, the designators 1008_1, 1008_n denote output of the detectors 1002_1, 1002_n, respectively.

In some implementations, the detection signals may be delivered to a next layer of the detectors 1012 (comprising detectors 1012_1, 1012_m, 1012_k) for recognition of complex object features and objects, similar to the exemplary implementation described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated herein by reference in its entirety. In some implementations, individual subsequent layers of detectors may be configured to receive signals from the previous detector layer, and to detect more complex features and objects (as compared to the features detected by the preceding detector layer). For example, a bank of edge detectors may be followed by a bank of bar detectors, followed by a bank of corner detectors and so on, thereby enabling alphabet recognition by the apparatus.

Individual ones of the detectors 1002 may output detection (e.g., post-synaptic) signals on communication channels 1008_1, 1008_n (with appropriate latency) that may propagate with different conduction delays to the detectors 1012. The detector cascade of the implementation illustrated in FIG. 10 may contain any practical number of detector nodes and detector banks determined, inter alia, by the software/hardware resources of the detection apparatus and complexity of the objects being detected.

The sensory processing apparatus implementation illustrated in FIG. 10 may comprise lateral connections 1006.

In some implementations, the apparatus 1000 may comprise feedback connections 1014, configured to communicate context information from detectors within one hierarchy layer to previous layers, as illustrated by the feedback connections 1014_1 in FIG. 10. In some implementations, the feedback connection 1014_2 may be configured to provide feedback to the encoder 1024 thereby facilitating sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra.

Figure 11A:
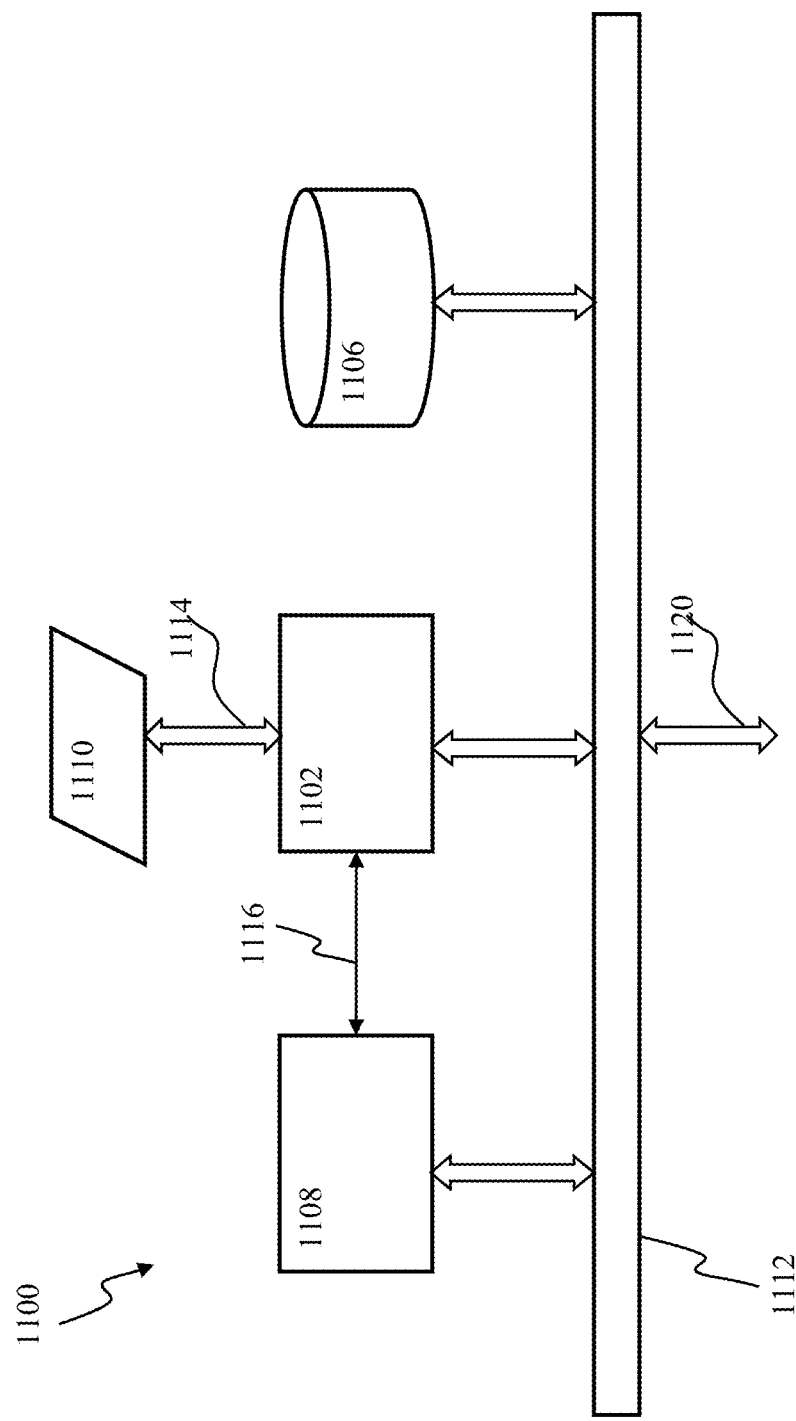
FIG. 11A is a block diagram illustrating computerized system useful for state-dependent connection plasticity mechanism in a spiking network, in accordance with one or more implementations.

One particular implementation of the computerized neuromorphic processing system, for operating a computerized spiking network (and implementing the exemplary state-dependent plasticity methodology described supra), is illustrated in FIG. 11A. The computerized system 1100 of FIG. 11A may comprise an input interface 1110, such as for example an image sensor, a computerized spiking retina, an audio array, a touch-sensitive input device, etc. The input interface 1110 may be coupled to the processing block (e.g., a single or multi-processor block) via the input communication interface 1114. The system 1100 may comprise a random access memory (RAM) 1108, configured to store neuronal states and connection parameters (e.g., weights 526 in FIG. 5), and to facilitate synaptic updates. In some implementations, synaptic updates may be performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra.

In some implementations, the memory 1108 may be coupled to the processor 1102 via a direct connection (memory bus) 1116. The memory 1108 may also be coupled to the processor 1102 via a high-speed processor bus 1112.

The system 1100 may comprise a nonvolatile storage device 1106. The nonvolatile storage device 1106 may comprise computer readable instructions configured to implement various aspects of spiking neuronal network operation (e.g., sensory input encoding, connection plasticity, operation model of neurons, and/or other aspects of spiking neuronal network operation). In one or more implementations, the nonvolatile storage 1106 may be used to store state information of the neurons and connections when, for example, saving/loading network state snapshot, implementing context switching, saving current network configuration for later use and loading previously stored network configuration, and/or responsive to other operations. A current network configuration may comprise information associated with one or more of connection weights, update rules, neuronal states, learning rules, and/or other information related to network configuration.

In some implementations, the computerized apparatus 1100 may be coupled to one or more external processing/storage/input devices via an I/O interface 1120, such as a computer I/O bus (PCI-E), wired (e.g., Ethernet) or wireless (e.g., Wi-Fi) network connection.

In some implementations, the input/output interface may comprise a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces may be similarly applicable to implementations of the invention including, for example, an LCD/LED monitor, touch-screen input and display device, speech input device, stylus, light pen, trackball, and/or other input/output interfaces.

Figure 11B:
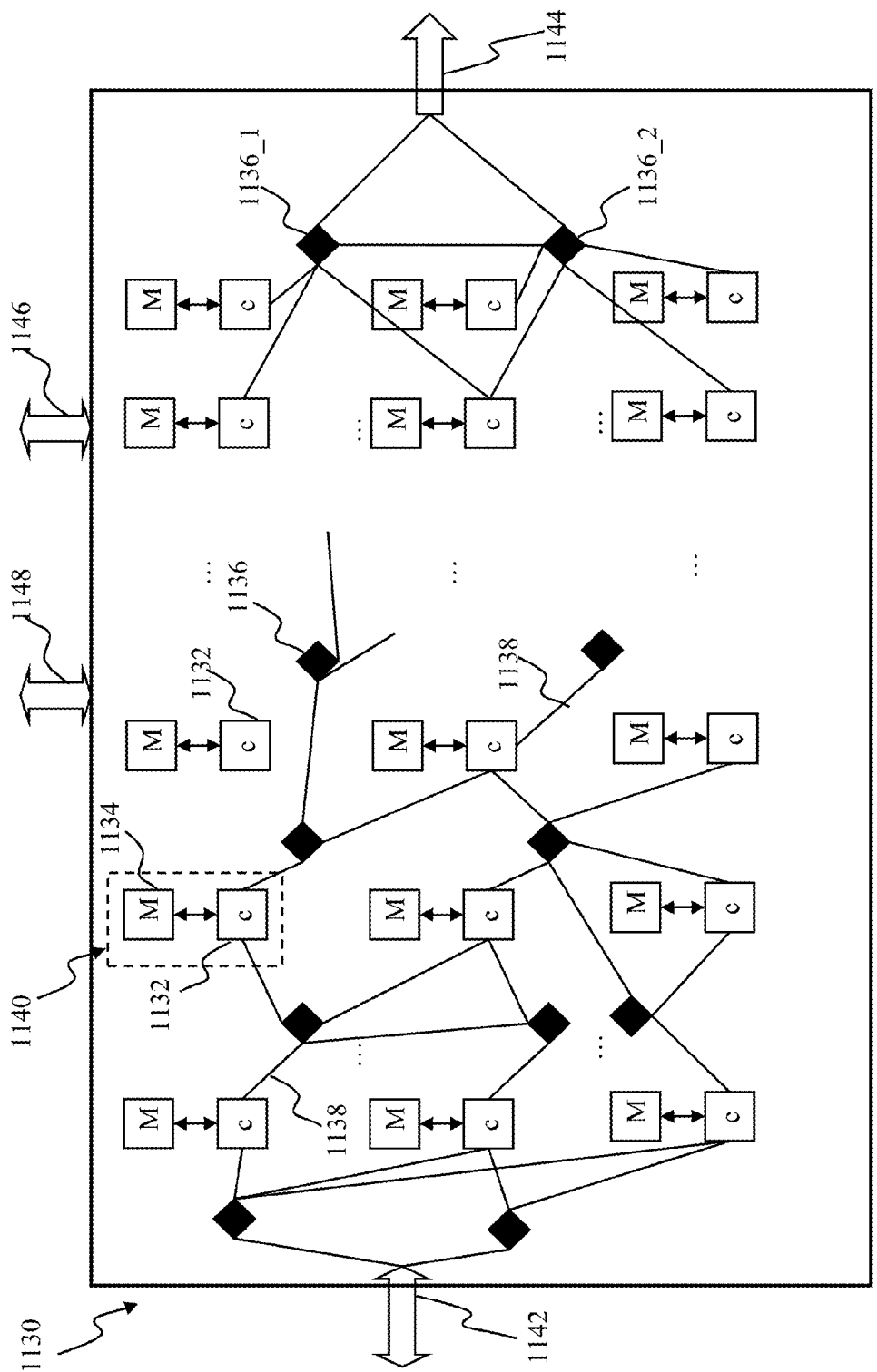
FIG. 11B is a block diagram illustrating a neuromorphic computerized system useful with state-dependent connection plasticity mechanism in a spiking network, in accordance with one or more implementations.

Referring now to FIG. 11B, one implementation of neuromorphic computerized system configured to implement state-dependent plasticity mechanism in a spiking network is described in detail. The neuromorphic processing system 1130 of FIG. 11B may comprise a plurality of processing blocks (micro-blocks) 1140 where individual micro cores may comprise a computing logic core 1132 and a memory block 1134. The logic core 1132 may be configured to implement various aspects of neuronal node operation, such as the node model, and synaptic update rules (e.g., the I-STDP) and/or other tasks relevant to network operation. The memory block may be configured to store, inter alia, neuronal state variables and connection parameters (e.g., weights, delays, I/O mapping) of connections 1138.

The micro-blocks 1140 may be interconnected with one another using connections 1138 and routers 1136. As it is appreciated by those skilled in the arts, the connection layout in FIG. 11B is exemplary, and many other connection implementations (e.g., one to all, all to all, etc.) may be compatible with the disclosure.

The neuromorphic apparatus 1130 may be configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 may be configured to provide output (e.g., an indication of recognized object or a feature, or a motor command, e.g., to zoom/pan the image array) via the interface 1144.

The apparatus 1130, in one or more implementations, may interface to external fast response memory (e.g., RAM) via high bandwidth memory interface 1148, thereby enabling storage of intermediate network operational parameters (e.g., spike timing, etc.). The apparatus 1130 may also interface to external slower memory (e.g., Flash, or magnetic (hard drive)) via lower bandwidth memory interface 1146, in order to facilitate program loading, operational mode changes, and retargeting, where network node and connection information for a current task may be saved for future use and flushed, and previously stored network configuration may be loaded in its place.

Figure 11C:
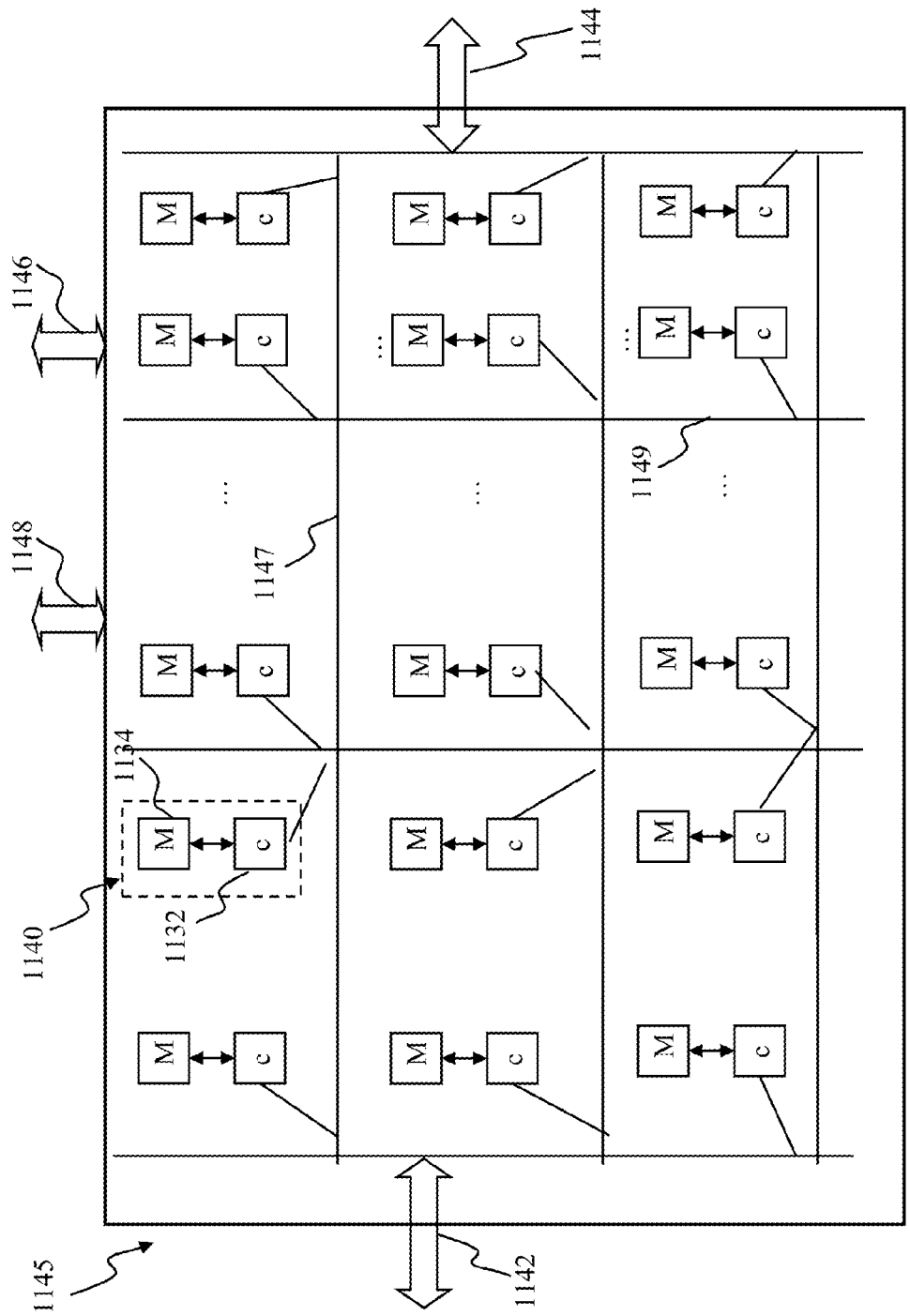
FIG. 11C is a block diagram illustrating a hierarchical neuromorphic computerized system architecture useful with state-dependent connection plasticity mechanism in a spiking network, in accordance with one or more implementations.

FIG. 11C illustrates one or more implementations of shared bus neuromorphic computerized system 1145 comprising micro-blocks 1140, described with respect to FIG. 11B, supra. The system 1145 of FIG. 11C may utilize shared bus 1147, 1149 to interconnect micro-blocks 1140 with one another.

Figure 11D:
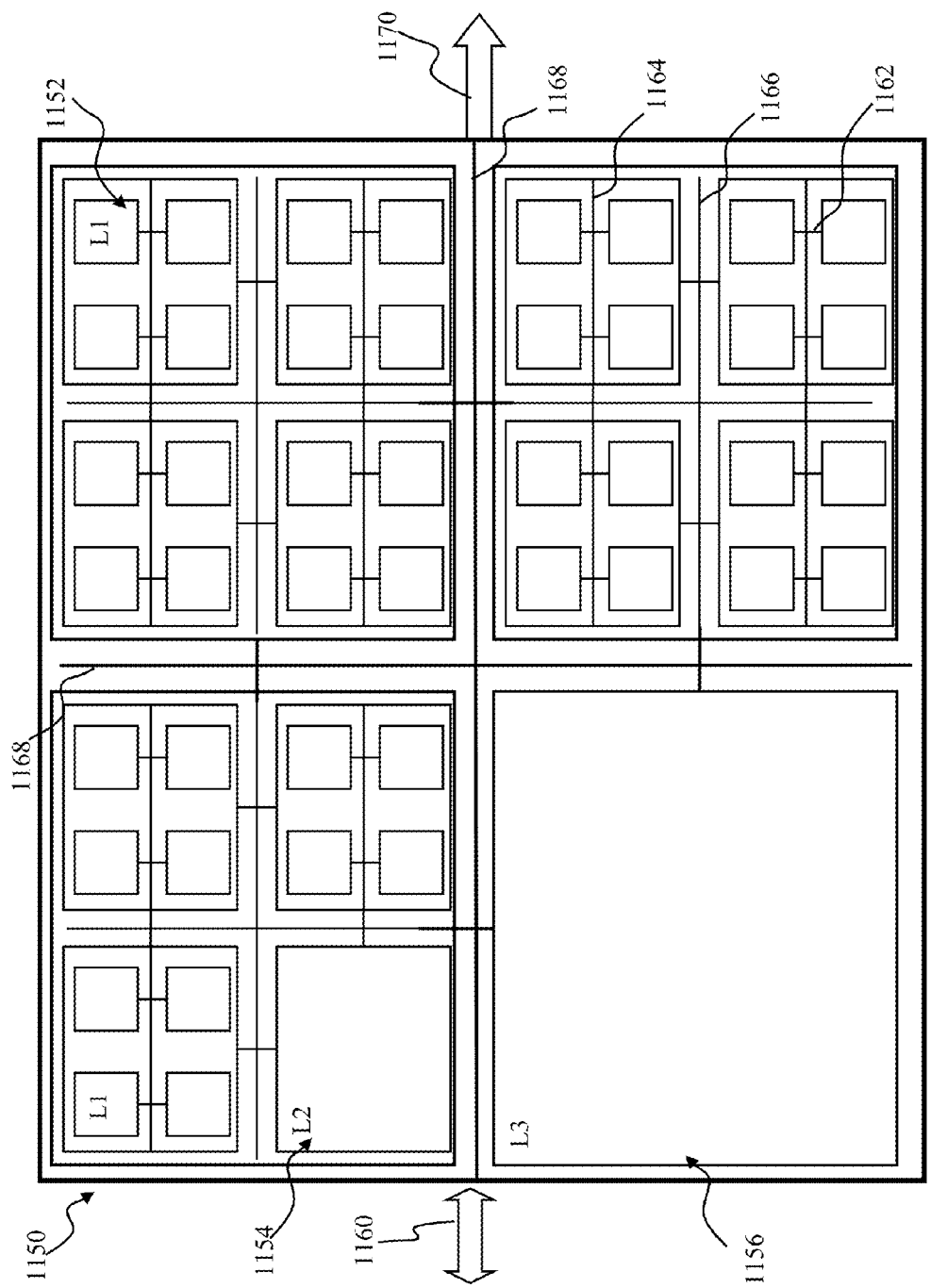
FIG. 11D is a block diagram illustrating cell-type neuromorphic computerized system architecture useful with state-dependent connection plasticity mechanism in a spiking network, in accordance with one or more implementations.

FIG. 11D, illustrates one implementation of cell-based neuromorphic computerized system architecture configured to implement state-dependent plasticity mechanism in a spiking network is described in detail. The neuromorphic system 1150 of FIG. may comprise a hierarchy of processing blocks (cells block). In some implementations, the lowest level L1 cell 1152 of the apparatus 1150 may comprise logic and memory and may be configured similar to the micro block 1140 of the apparatus shown in FIG. 11B. A number of cell blocks may be arranged in a cluster and communicate with one another a local interconnects 1162, 1164. Individual ones of such clusters may form higher level cell, e.g., cell L2, denoted as 1154 in FIG. 11*d*. Similarly several L2 clusters may communicate with one another via a second level interconnect 1166 and form a super-cluster L3, denoted as 1156 in FIG. 11D. The super-clusters 1156 may communicate via a third level interconnect 1168 and may form a next level cluster (e.g., the apparatus 1150). It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In one implementation, different L1 cells may process in parallel different portions of the visual input (e.g., encode different frame macro-blocks), with the L2, L3 cells performing progressively higher level functionality (e.g., edge detection, object detection). Different L2, L3, cells may also perform different aspects of operating, for example, a robot, with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform all of the I/O functionality using single I/O block (not shown).

The apparatus 1150, in one or more implementations, may interface to external fast response memory (e.g., RAM) via high bandwidth memory interface (not shown), thereby enabling storage of intermediate network operational parameters (e.g., spike timing). In one or more implementations, the apparatus 1150 may also interface to external slower memory (e.g., flash or magnetic hard drive) via lower bandwidth memory interface (not shown), in order to facilitate program loading, operational mode changes, and retargeting, where network node and connection information for a current task may be saved for future use and flushed, and previously stored network configuration may be loaded in its place.

In one or more implementations, networks of the apparatus 1130, 1145, 1150 may be implemented using Elementary Network Description (END) language, described for example in U.S. patent application Ser. No. 13/239,123, entitled "ELEMENTARY NETWORK DESCRIPTION FOR NEUROMORPHIC SYSTEMS", filed Sep. 21, 2011, and/or High Level Neuromorphic Description (HLND) framework, described for example in U.S. patent application Ser. No. 13/385,938, entitled "TAG-BASED APPARATUS AND METHODS FOR NEURAL NETWORKS", filed Mar. 15, 2012, each of the foregoing being incorporated herein by reference in its entirety. In one or more implementations, the HLND framework may be augmented to handle event based update methodology described, for example U.S. patent application Ser. No. 13/588,774, entitled "APPARATUS AND METHODS FOR IMPLEMENTING EVENT-BASED UPDATES IN SPIKING NEURON NETWORK", filed Aug. 17, 2012, the foregoing being incorporated herein by reference in its entirety. In some implementations, the networks may be updated using an efficient network update methodology, described, for example, in U.S. patent application Ser. No. 13/385,938, entitled "APPARATUS AND METHODS FOR EFFICIENT UPDATES SPIKING NEURON NETWORKS", filed Jul. 27, 2012, the foregoing being incorporated herein by reference in its entirety.

Figure 12A:
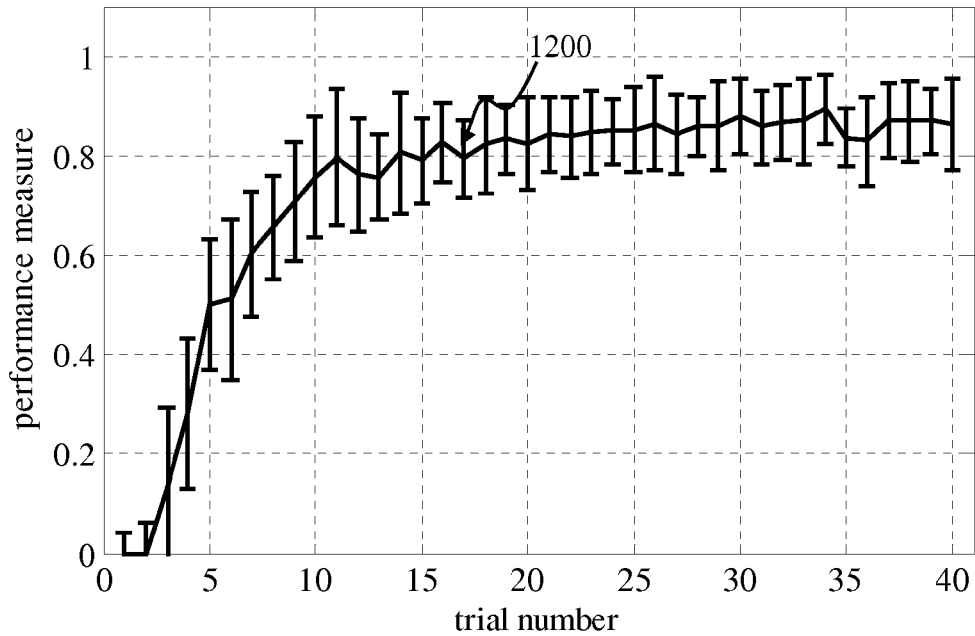
FIGS. 12A, 12B, and 12C include plots illustrating learning performance obtained using methodology of the prior art.
Figure 12B:
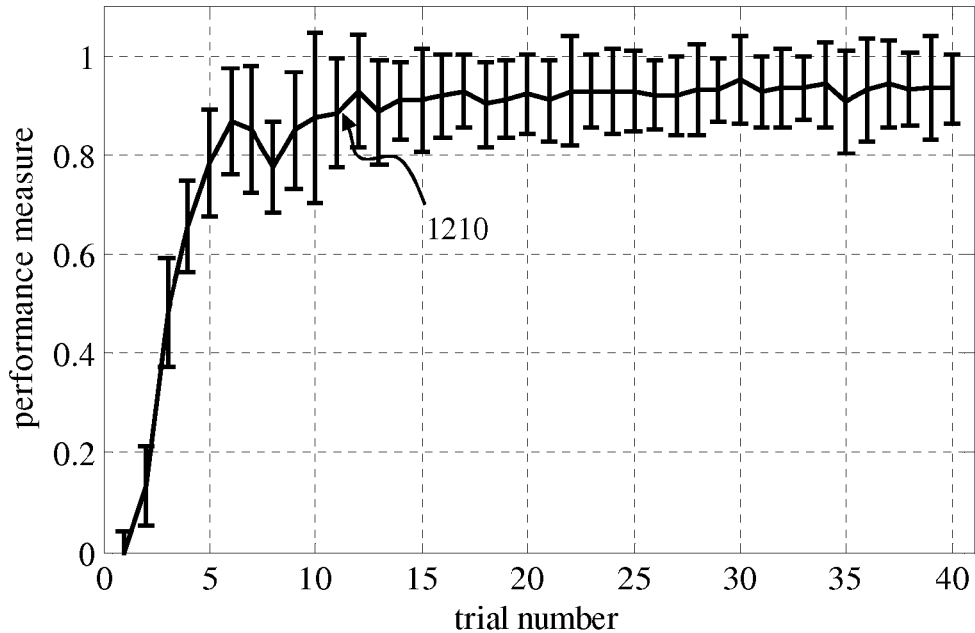
Figure 12C:
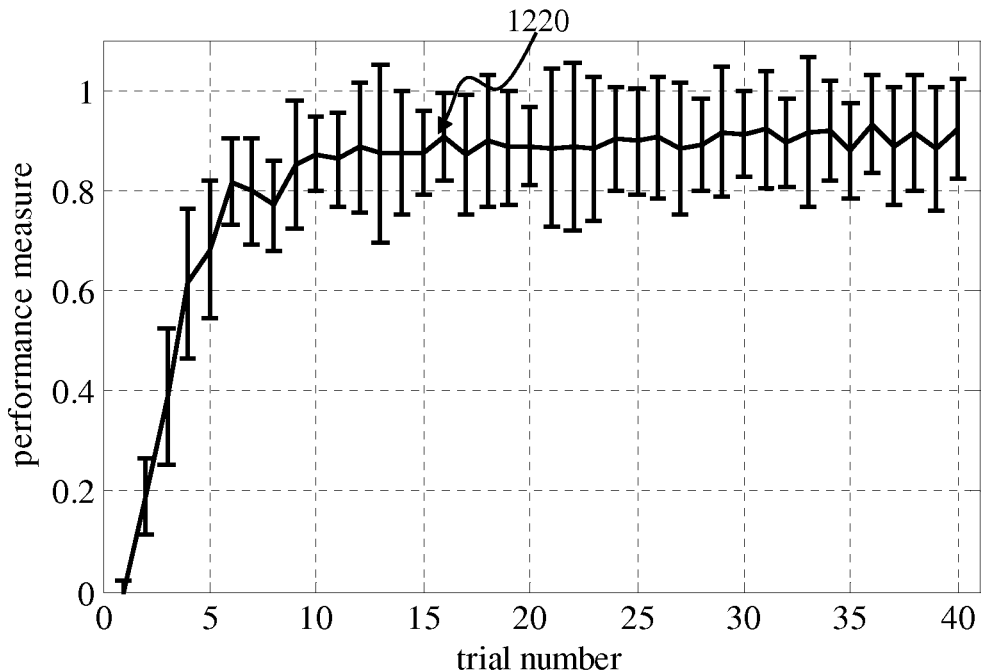
Figure 13:
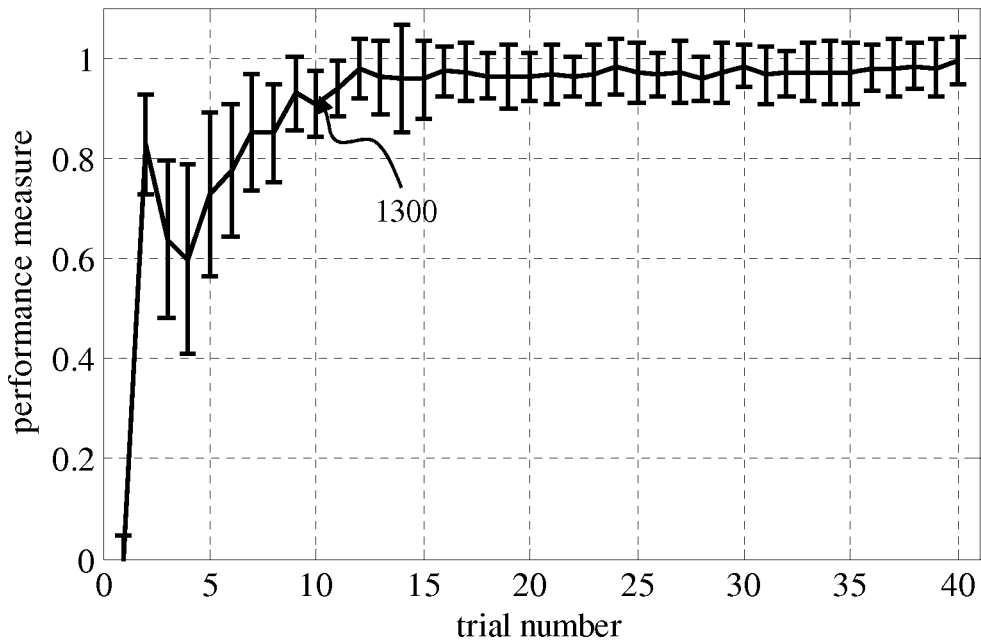
FIG. 13 is a plot illustrating learning performance obtained using state-dependent plasticity, in accordance with one or more implementations.

FIGS. 12A-13 present exemplary performance results obtained during simulation and testing performed by the Assignee hereof of exemplary computerized spiking network apparatus configured to implement the state dependent learning framework described above with respect to FIGS. 4-5B.

The exemplary apparatus, in one implementation, may comprise a spiking neuron network composed of a single leaky integrate and fire neuron, such as the neuron 430 of FIG. 4 described above. The network may comprise 600 synaptic inputs (e.g. the inputs 414 in FIG. 4. The input into the network (e.g., the input 402 in FIG. 4) comprises stochastic spike trains generated using a Poisson process. In the implementation illustrated in FIG. 13, the Poisson process is characterized by an average spike occurrence frequency of 4 spikes/sec.

The exemplary network may receive a teaching signal (e.g., the input 404 in FIG. 4). The teaching input may comprise a stochastic signal generated using a Poisson process with a spike occurrence frequency of 25 spikes/sec.

In one or more implementations, the neuron 430 learning process may be configured in accordance with an error measure C. The error measure C may be determined based on a correlation between the target spike train (e.g., the signal 404 in FIG. 4) and the neuron output (e.g., the signal 408 in FIG. 4). The measure C may be used to determine a distance between the target $y^d$ and the actual output $y^o$ spike trains. The error measure C may be determined using a convolution (in discrete time) of low-pass filtered versions of the target $y^d$ and the actual $y^o$ output spike trains as follows:

$$C = \frac{\hat{y}^d \cdot \hat{y}^o}{|\hat{y}^d| \cdot |\hat{y}^o|}, \; \hat{y}(t) = \int_0^\tau y(t)g(t-\tau)dt, \tag{Eqn. 19}$$

where:
$\hat{y}$ denotes a second-order low-pass filter;
symbol · denotes the inner product; and
| | denotes the Euclidean norm.

In one or more implementations, the low pass filter time constants for the desired and the actual output may be selected at 2 ms and 4 ms, respectively. By way of a non-limiting example, the measure of Eqn. 19 may be close to one when the output spike train closely resembles (e.g., is identical to) the desired spike train; and may be close to zero when the output spike train is dissimilar (uncorrelated) with the desired spike train.

The performance function (the measure of Eqn. 19) of the neuron learning process may be configured to cause the neuron to generate the output (e.g., the output 408 in FIG. 4) that is consistent with the teaching signal. In one or more implementations, the consistency may be determined using a correlation measure $C(y^d, y^o)$ between the teaching signal and the output signal. A correlation measure of $C(y^d, y^o)=1$ may correspond to the output $y^o$ being identical to the training input $y^d$; a correlation measure of $C(y^d, y^o)=0$ may correspond to the output $y^o$ being uncorrelated with the training input $y^d$.

An individual training run (epoch) may be configured to last between 0.01 s and 1-2 s, typically 500 ms. The network apparatus may be trained for a number of epochs (e.g., 40 according to one implementation). Statistics of individual training epoch may be determined. In some implementations, the statistics may comprise determination of an epoch mean correlation <C>, an epoch correlation variance, an epoch correlation confidence interval, and/or other parameters. In one or more implementations, the statistics estimates of two or more epochs (e.g., 20 as shown in FIGS. 12A-12B) may be averaged.

FIGS. 12A-12C present statistics of the learning process performance obtained in accordance with the methodology of the prior art (e.g., Eqn. 6). Individual curves in FIGS. 12A-12C are obtained as follows:
curve 1200 of FIG. 12A corresponds to non-dimensional learning rate η=5;
curve 1210 of FIG. 12B corresponds to non-dimensional learning rate η=10; and
curve 1220 of FIG. 12C corresponds to non-dimensional learning rate η=20.

As may be discerned from Eqn. 6, a smaller value of the learning rate (e.g., 5) may correspond to a smaller change in the learning parameter θ and slower rate of learning. A larger value of the learning rate (e.g., 20) may correspond to a greater change in the learning parameter θ and faster rate of learning.

As shown in FIGS. 12A-12C, learning performance (as characterized by the average value of correlation measure) of the prior art increases with the increase of the learning rate η. When the learning rate η=20, the correlation measure reaches 0.87 after 10-13 trials. Larger learning parameter changes associated with larger learning rates may reduce precision of the learning process as illustrated by wider error bars of the curve 1220 compared to the error bars of the curve 1210.

Contrast the performance results of FIG. 12A-12C with the performance data obtained using state-dependent learning of the disclosure illustrated in FIG. 13. As shown by the curve 1300 of FIG. 13, the correlation measure reaches 0.85 after about 13 trials. At the same time, the precision of the learning is improved, compared to the prior art as illustrated by smaller error bars of the curve 1300, compared to error bars of the curves 1200, 1210, 1220.

As seen from comparing the prior art data (FIGS. 12A-12C) and the state-dependent learning performance of the disclosure (FIG. 13), the convergence speed (for the same average correlation) and/or learning precision of the prior art is well below the performance of the methodology of the present disclosure.

The methodology described herein may provide generalized framework for implementing state-dependent learning in spiking neuron networks.

While the prior art typically employs constant plasticity, the methodology of one or more implementations of the disclosure uses neuron state in order to determine learning parameter adjustments. When the post-synaptic neuron is already likely to fire (e.g., neuron state is close to the firing threshold) such state-dependent plasticity may, advantageously, reduce potentiation of the contributing input connections compared to the plasticity rules of the prior art. When the post-synaptic neuron is 'far' from firing (e.g., the neuron state is far from the firing threshold), the connection potentiation of the disclosure will be greater compared to the prior art.

The state-dependent learning may increase the convergence speed due to, at least partly, greater potentiation of connections when the neuron state is far from the firing threshold.

The state-dependent learning may reduce network output oscillation (e.g., overshoots) and/or improve learning precision (compared to the prior art) due to reduced connection potentiation when the neuron state is close to the firing threshold.

Such reduced potentiation may, advantageously, avoid over-potentiation of inputs where too much potentiation may result in the post-synaptic neuron generating multiple responses (e.g., burst firing). Such burst firing is often found in the implementations of the prior art, where the number of spikes and the duration of such a 'burst' of spikes may typically be a function of the strength of the pre-synaptic connections and the time constants of the synaptic currents and the excitatory postsynaptic potentials.

In one or more implementations, the generalized state-dependent learning methodology of the disclosure may be implemented as a software library configured to be executed by a computerized neural network apparatus (e.g., containing a digital processor). In some implementations, the generalized learning apparatus may comprise a specialized hardware module (e.g., an embedded processor or controller). In some implementations, the spiking network apparatus may be implemented in a specialized or general purpose integrated circuit (e.g., ASIC, FPGA, and/or PLD). Myriad other implementations may exist that will be recognized by those of ordinary skill given the present disclosure.

Advantageously, the present disclosure can be used to simplify and improve control tasks for a wide assortment of control applications including, without limitation, industrial control, adaptive signal processing, navigation, and robotics. Exemplary implementations of the present disclosure may be useful in a variety of devices including without limitation prosthetic devices (such as artificial limbs), industrial control, autonomous and robotic apparatus, HVAC, and other electro-mechanical devices requiring accurate stabilization, set-point control, trajectory tracking functionality or other types of control. Examples of such robotic devices may include manufacturing robots (e.g., automotive), military devices, and medical devices (e.g., for surgical robots). Examples of autonomous navigation may include rovers (e.g., for extraterrestrial, underwater, hazardous exploration environment), unmanned air vehicles, underwater vehicles, smart appliances (e.g., ROOMBA®), and/or robotic toys. The present disclosure can advantageously be used in all other applications of adaptive signal processing systems (comprising for example, artificial neural networks), including: machine vision, pattern detection and pattern recognition, object classification, signal filtering, data segmentation, data compression, data mining, optimization and scheduling, and/or complex mapping.

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed:

1. A computerized spiking neuron apparatus configured to implement a supervised learning process, the apparatus comprising:
   one or more processors configured to execute computer program modules, the computer program modules being executable to cause one or more processors to:
      based on an event, determine excitability of the neuron, the excitability being updateable in accordance with one or more inputs to the neuron, the inputs being configured to provide data related to an environment external to the neuron;
      based on the excitability, determine an efficacy adjustment for at least one connection of the neuron, a given neuron being configured to provide at least a portion of the one or more inputs to the neuron; and modify a parameter characterizing a current state of the given neuron;

wherein:
the modification of the parameter is effectuated in accordance with a response process, the response process being configured based on the current state breaching a response threshold;

the efficacy adjustment comprises an efficacy change, the efficacy change being determined based on a base change value less an adjustment value, the adjustment value being configured based on a difference between the current state and the response threshold; and the adjustment value is configured proportional to the difference between the current state and the response threshold.

2. The apparatus of claim 1, wherein:
the event is based on a pre-synaptic input comprising at least a portion of the one or more inputs; and
the computer program modules are further executable to cause one or more processors to update the excitability based on the pre-synaptic input.

3. The apparatus of claim 1, wherein:
the event comprises a teaching signal indicative of a target output for the neuron;
the excitability is configured to characterize a current state of the neuron associated with the learning process; and
the adjustment is configured to transition the current state towards a target state, the target state being associated with the target output.

4. The apparatus of claim 1, wherein:
the at least one connection is potentiated when the event is associated with a teaching signal indicative of a target output for the neuron; and
the adjustment is configured to transition the current state towards a target state, the target state being associated with the target output.

5. The apparatus of claim 1, wherein:
the connection is depressed when the event is associated with a post-synaptic response by the neuron.

6. A computer-implemented method of operating a data interface of a node in a computerized spiking neural network, the method being performed by one or more processors configured to execute computer program modules, the method comprising:
updating an efficacy of the interface based on a parameter characterizing a current state of the node;
wherein:
the node is configured to generate an output based on one or more inputs via the interface;
the one or more inputs are configured to modify the parameter;
the update is configured to transition the current state towards a target state, the target state being associated with the node producing target output;
the modification of the parameter is effectuated in accordance with a response process, the response process being configured based on the current state breaching a response threshold;
the efficacy update comprises an efficacy change, the efficacy change being determined based on a base change value less an adjustment value, the adjustment value being configured based on a difference between the current state and the response threshold; and
the adjustment value is configured proportional to the difference between the current state and the response threshold.

7. The method of claim 6, wherein:
the update is configured to transition the present state towards a target state, the target state being associated with the node to generate an output consistent with one or more data items.

8. The method of claim 6, wherein:
the node comprises a spiking neuron;
the input comprises one or more spikes;
the interface comprises a synaptic connection capable of communicating the one or more spikes to the neuron;
the efficacy comprises a transmission probability of data through the input connection;
the parameter is configured to characterize membrane potential of the neuron; and
the update comprises a change of the transmission probability being determined based on a function of the membrane potential.

9. The method of claim 8, wherein:
the change of the weight is determined based on a value of an eligibility trace, the eligibility trace comprising a time history of the one or more spikes, the time history including information associated with individual ones of the one or more spikes occurring at time instances prior to the update.

10. The method of claim 6, wherein:
the modification of the parameter is effectuated in accordance with a response process, the response process being configured based on the current state breaching a response threshold; and
the efficacy update comprises an efficacy change, the efficacy change being configured proportional to a difference between the current state and the response threshold.

11. The method of claim 6, wherein:
the adjustment value is configured based on an exponential function of the difference between the current state and the threshold so that one value of the difference causes a smaller adjustment value compared to another value of the difference that is greater than the one value.

12. The method of claim 6, wherein:
the node comprises a spiking neuron;
the input comprises one or more spikes;
the interface comprises a synaptic connection configured to communicate the one or more spikes to the neuron;
the efficacy comprises a connection weight;
the parameter is configured to characterize membrane potential of the neuron; and
the update comprises a change of the weight, the change of the weight being determined based on a function of (i) the membrane potential and (ii) a value of an eligibility trace, the eligibility trace comprising a time history of the one or more spikes, the time history including information associated with individual ones of the one or more spikes occurring at time instances prior to the update.

13. The method of claim 6, wherein:
the node comprises a spiking neuron operable in accordance with a stochastic neuron response generation process;
the input comprises one or more spikes;
the interface comprises a synaptic connection capable of communicating the one or more spikes to the neuron;
the efficacy comprises a connection weight;
the parameter is configured to characterize probability of the response being generated in accordance with the response generation process; and the efficacy update comprises a change of the weight, the change of the weight being determined based on a function of the probability of the response at the time of the update.

14. The method of claim 13, wherein:

for a first value of the probability of the response, the function is configured to produce a smaller change in the weight compared to the weight change associated with a second value of the probability of the response, the first value being greater than the second value.

15. A computerized spiking neuron network system configured to determine efficacy of a connection for a response by a neuron configured to receive input via the connection, the system comprising:

one or more processors configured to execute computer program modules, the computer program modules being executable to cause one or more processors to:

determine a state parameter of the neuron based on a history of neuron excitability, the state parameter being configured to characterize the excitability, the history of the neuron excitability being based on the neuron excitability prior to the response by the neuron;

determine an adjustment of the efficacy based on the state parameter, the efficacy being configured to characterize an effect of the input on the efficacy; and modify the state parameter, the modification of the state parameter being effectuated in accordance with a response process, the response process being configured based on the current state breaching a response threshold;

wherein:

the efficacy adjustment comprises an efficacy change, the efficacy change being determined based on a base change value less an adjustment value, the adjustment value being configured based on a difference between the current state and the response threshold; and the adjustment value is configured proportional to the difference between the current state and the response threshold.

16. The system of claim 15, wherein the neuron is operable in accordance with a learning process, the learning process being configured to achieve a target outcome;

the neuron excitability is configured to characterize a state of the process based on the input; and the history of the excitability being determined based on a low pass filter of the excitability.

17. The system of claim 15, wherein the state parameter is determined based on a time integral of the excitability over a time window prior to the response time.

18. The system of claim 15, wherein the state parameter is determined based on a moving average of the excitability over a time window prior to the response time.

19. The system of claim 15, wherein, responsive to the input being updated at a rate of about one millisecond, the time window is defined as being between one millisecond and five milliseconds, inclusive.

20. A system configured for operating a data interface of a node in a computerized spiking neural network, the system comprising:

means for updating an efficacy of the interface based on a parameter characterizing a current state of the node;

wherein:

the node is configured to generate an output based on one or more inputs via the interface;

the one or more inputs are configured to modify the parameter;

the update is configured to transition the current state towards a target state, the target state being associated with the node producing target output;

the modification of the parameter is effectuated in accordance with a response process, the response process being configured based on the current state breaching a response threshold;

the efficacy update comprises an efficacy change, the efficacy change being determined based on a base change value less an adjustment value, the adjustment value being configured based on a difference between the current state and the response threshold; and the adjustment value configured proportional to the difference between the current state and the response threshold.

* * * * *